US011621757B2

(12) United States Patent
Jam et al.

(10) Patent No.: US 11,621,757 B2
(45) Date of Patent: Apr. 4, 2023

(54) SYSTEM AND METHOD FOR A MULTI-BEAM BEAMFORMING FRONT-END ARCHITECTURE FOR WIRELESS TRANSCEIVERS

(71) Applicant: SkyGig, LLC, Ann Arbor, MI (US)

(72) Inventors: Armin Jam, Ann Arbor, MI (US); Avish Koochak Kosari, Ann Arbor, MI (US)

(73) Assignee: SkyGig, LLC, Ann Arbor, MI (US)

( * ) Notice: Subject to any disclaimer, the term of this patent is extended or adjusted under 35 U.S.C. 154(b) by 0 days.

(21) Appl. No.: 17/345,668

(22) Filed: Jun. 11, 2021

(65) Prior Publication Data
US 2021/0391904 A1 Dec. 16, 2021

Related U.S. Application Data

(60) Provisional application No. 63/038,043, filed on Jun. 11, 2020.

(51) Int. Cl.
*H04B 7/06* (2006.01)
*H04B 7/0408* (2017.01)
(Continued)

(52) U.S. Cl.
CPC ............. *H04B 7/0617* (2013.01); *H01Q 3/02* (2013.01); *H01Q 13/10* (2013.01);
(Continued)

(58) Field of Classification Search
CPC ................ H04B 7/0617; H04B 7/0408; H04B 7/0634; H04B 7/0695; H04B 7/0842; H01Q 3/02; H01Q 13/10; H04W 72/046
See application file for complete search history.

(56) References Cited

U.S. PATENT DOCUMENTS

| 9,537,559 | B1 | 1/2017 | Liu |
| 10,420,063 | B2 * | 9/2019 | Ly ............................ G01S 5/00 |

(Continued)

FOREIGN PATENT DOCUMENTS

| CN | 110784251 | 2/2020 |
| TW | 201032392 | 9/2010 |

(Continued)

OTHER PUBLICATIONS

Search Report issued in corresponding TW Application 110121527, dated Jan. 12, 2022, 10 pages.

(Continued)

*Primary Examiner* — Jaison Joseph
(74) *Attorney, Agent, or Firm* — Burris Law, PLLC

(57) ABSTRACT

A front-end antenna system for transmitting and receiving one or more beams and including at least one of a radio frequency (RF) stage, an intermediate frequency (IF) stage, and a digital stage includes one or more beam networks configured to form one or more signal streams over the one or more beams, where each beam network from among the one or more beam networks comprises a beamformer network, a switching network, or a combination thereof. The front-end antenna system includes an array of antennas configured to output each of the beams in a selected spatial region from among a plurality of spatial regions, where one or more antennas from among the array of antennas are multiport antennas. The front-end antenna system includes a plurality of transceivers that electrically couple the array of antennas and the one or more beam networks.

20 Claims, 16 Drawing Sheets

(51) Int. Cl.
H01Q 3/02 (2006.01)
H01Q 13/10 (2006.01)
H04B 7/08 (2006.01)
H04W 72/044 (2023.01)

(52) U.S. Cl.
CPC ......... *H04B 7/0408* (2013.01); *H04B 7/0634* (2013.01); *H04B 7/0695* (2013.01); *H04B 7/0842* (2013.01); *H04W 72/046* (2013.01)

(56) References Cited

U.S. PATENT DOCUMENTS

| | | |
|---|---|---|
| 11,233,557 B2 | 1/2022 | Lee et al. |
| 2015/0263780 A1 | 9/2015 | Mehlman et al. |
| 2015/0318618 A1 | 11/2015 | Chen et al. |
| 2020/0091608 A1* | 3/2020 | Alpman ............... H01Q 25/001 |
| 2020/0351815 A1* | 11/2020 | Kim ..................... H04W 56/00 |
| 2021/0257739 A1* | 8/2021 | Mathews ............. H01Q 1/2283 |
| 2021/0391904 A1* | 12/2021 | Jam .......................... H01Q 3/36 |

FOREIGN PATENT DOCUMENTS

| | | |
|---|---|---|
| TW | 201728111 | 8/2017 |
| WO | 2020028579 | 2/2020 |

OTHER PUBLICATIONS

International Search Report for International Application PCT/US2021/037058, dated Sep. 28, 2021.
Search Report issued in corresponding TW Application 110121527, dated Jul. 21, 2022.

\* cited by examiner

SYSTEM AND METHOD FOR A MULTI-BEAM BEAMFORMING FRONT-END ARCHITECTURE FOR WIRELESS TRANSCEIVERS

CROSS-REFERENCE TO RELATED APPLICATIONS

This application priority to and the benefit of U.S. Provisional Application No. 63/038,043, filed on Jun. 11, 2020. The disclosure of the above application is incorporated herein by reference. This application is related to copending application filed concurrently herewith titled "ANTENNA SYSTEM FOR A MULTI-BEAM BEAMFORMING FRONT-END WIRELESS TRANSCEIVER," which is commonly assigned with the present application and the contents of which is incorporated herein by reference.

FIELD

The present disclosure relates to wireless radio wave transceivers and, more specifically, to a multi-beam beamforming front-end antenna system.

BACKGROUND

The statements in this section merely provide background information related to the present disclosure and may not constitute prior art.

Radio wave wireless technology is ubiquitous and is used in various applications including, but not limited to: telecommunication and satellite communications industries, sensors and navigation systems in mobile platforms (e.g. self-driving cars in the automotive industry), among others.

Wireless communication technologies are transitioning to higher millimeter-wave frequency bands. These frequency bands have the advantage of availability of wider bandwidths to unlock increased connection speeds. Despite these advantages, however, current wireless technologies may implement sophisticated approaches and architectures compared to conventional wireless technologies.

For example, radio wave wireless devices may include antennas, radio frequency (RF) circuits, analog and digital circuits, along with the system architecture that controls the operation and connections of the various components. Together, the wireless front-end system defines the performance and functionality of the wireless device. For high data-rate wireless communications, especially at high millimeter-wave bands, high-gain front-end systems with often narrow beams, high power levels in transmission, and sensitivity levels in reception are needed to compensate for signal propagation losses over practical ranges. As such, high-gain front-end systems with advanced beamforming mechanism may be required to enable this wireless communication technology.

There are a number of approaches to implement beamforming in wireless front-ends, with phased-array systems and tunable metamaterial antennas often being considered as common approaches. Both approaches are based on distribution of radiating elements over an aperture with control over phase and/or amplitude of the individual elements to create a desired beamforming property. However, the phased-arrays and metamaterial technologies may have high spectral inefficiency, limited capacity, and high-power inefficiency (especially with large apertures and/or large number of elements), among others. More specifically, current analog phased arrays and metamaterials approaches are often limited to single beam operation for signal transfer and/or receive, which inhibits their capacity, aggregated throughput (for communication systems), and overall performance. Furthermore, for large apertures, high RF losses (especially with large number of elements in high gain front-ends) result in poor power efficiencies in these systems. Digital beamforming approaches, on the other hand, are capable of multi-beam operation. But with larger number of elements and wide operating bandwidths (especially at millimeter-wave frequency band), these approaches may not be implemented due to the excessive power consumption and power inefficiency in their digital and RF/analog circuitry (e.g. DACs and ADCs).

SUMMARY

This section provides a general summary of the disclosure and is not a comprehensive disclosure of its full scope or all of its features.

The present disclosure provides a front-end antenna system for transmitting and receiving one or more beams and including at least one of a radio frequency (RF) stage, an intermediate frequency (IF) stage, and a digital stage. The front-end antenna system comprises one or more beam networks configured to form one or more signal streams over the one or more beams, where each beam network from among the one or more beam networks comprises a beamformer network, a switching network, or a combination thereof. The front-end antenna system comprises an array of antennas configured to output each of the beams in a selected spatial region from among a plurality of spatial regions, where one or more antennas from among the array of antennas are multiport antennas. The front-end antenna system comprises a plurality of transceivers that electrically couple the array of antennas and the one or more beam networks.

In one form, the front-end antenna system further comprises a controller configured to independently control radiation parameters and a beam type of the one or more beams. The radiation parameters comprise a direction, a pattern, a power, a polarization, a phase angle, frequency band, or a combination thereof. The beam type includes one of a transmit type beam, a receive type beam, and a simultaneous receive and transmit type beam.

In one form, the one or more beams include a plurality of beams, and the multiport antennas are operable to transmit the plurality of beams, receive the plurality of beams, or a combination thereof such that the plurality of beams have a same polarization, a same frequency band, or a combination thereof.

In one form, the one or more beam networks include the beamformer network, and the beamformer network includes one or more phase shifters, one or more time delay circuits, one or more combiners, one or more variable gain amplifiers, one or more splitters, or a combination thereof.

In one form, the one or more beam networks are configured to form the one or more beams at the RF stage, the IF stage, the digital stage, a local oscillator stage, or a combination thereof.

In one form, the one or more beam networks include the switching network. The switching network is electrically coupled to the array of antennas and the plurality of transceivers, and the switching network is configured to selectively provide the one or more signal streams to the one or more ports of the multiport antennas.

In one form, the one or more beam networks include a plurality of the switching networks, and a number of the plurality of transceivers is less than a number of ports of the multiport antenna.

In one form, the one or more beam networks include the switching network. The switching network includes one or more switches, one or more combiners, one or more splitters, one or more coupling lines, one or more filters, or a combination thereof.

In one form, the one or more beams include at least two beams, and the one or more beam networks include a plurality of the beamformer networks. Each beamformer network from among the plurality of the beamformer networks includes at least two delay elements, where the at least two delay elements include a phase shifter, a time delay, or a combination thereof. Each antenna port of the multiport antennas is coupled to the at least two delay elements of a corresponding beamformer network from among the plurality of beamformer networks.

In one form, the beam network is a hybrid beam network having an analog beam network portion and a digital beam network portion, and the plurality of transceivers include an analog to digital converter and a digital to analog converter. In a transmit mode, (i) the digital beam network portion is configured to split the one or more signal streams, (ii) the digital beam network portion is configured to select the one or more signal streams, (iii) the digital to analog converter is configured to convert the one or more signal streams to one or more analog signal streams, and the analog beam network portion is configured to split the one or more signal streams, select the one or more signal streams, or a combination thereof, (iv) or a combination of (i), (ii), (iii). In a receive mode, (v) the analog beam network portion is configured to combine the one or more signal streams, (vi) the analog beam network portion is configured to select the one or more signal streams, (vii) the analog to digital converter is configured to convert the one or more signal streams to one or more digital signal streams, and the digital beam network portion is configured to combine the one or more signal streams, select the one or more signal streams, or a combination thereof, (viii) or a combination of (v), (vi), (vii).

In one form, the front-end antenna system further comprises a plurality of sub-arrays. Each sub-array from among the plurality of sub-arrays includes: one or more substrate layers, one or more electronic chips, or a combination thereof; one or more antennas from among the array of antennas, and a set of transceivers from among the plurality of transceivers. The plurality of sub-arrays are coupled to each other via signal distribution networks, the one or more beam networks, the plurality of transceivers, or a combination of thereof.

In one form, the plurality of sub-arrays have one of a planar arrangement and a non-planar arrangement. A first sub-array from among the plurality of sub-arrays has a first set of geometric parameters, a second sub-array from among the plurality of sub-arrays has a second set of geometric parameters, and at least one geometric parameter from among the first set of geometric parameters is different than at least one geometric parameter from among the second set of geometric parameters.

In one form, the plurality of sub-arrays have one of a planar arrangement and a non-planar arrangement. A first sub-array from among the plurality of sub-arrays has a first set of geometric parameters, a second sub-array from among the plurality of sub-arrays has a second set of geometric parameters, and each geometric parameter from among the first set of geometric parameters is the same as each geometric parameter from among the second set of geometric parameters.

The present disclosure provides front-end antenna system for transmitting and receiving one or more beams and including at least one of a radio frequency (RF) stage, an intermediate frequency (IF) stage, and a digital stage. The front-end antenna system comprises: one or more beam networks configured to form one or more signal streams over the one or more beams, where each beam network from among the one or more beam networks comprises a beamformer network, a switching network, or a combination thereof. The front-end antenna system comprises an array of antennas configured to output each of the beams in a selected spatial region from among a plurality of spatial regions, where one or more antennas from among the array of antennas are single port antennas. The front-end antenna system comprises a plurality of transceivers that electrically couple the array of antennas and the one or more beam networks.

In one form, the single port antennas are passive antennas, the one or more beams include at least two beams, and the one or more beam networks include a plurality of the beamformer networks. Each beamformer network from among the plurality of the beamformer networks includes at least two delay elements, where the at least two delay elements include a phase shifter, a time delay, or a combination thereof. The single port antennas are coupled to the at least two delay elements of a corresponding beamformer network from among the plurality of beamformer networks.

In one form, the single port antennas are active antennas comprising one or more tunable components.

In one form, the one or more beams include at least two beams, and the one or more beam networks include a plurality of the beamformer networks. Each beamformer network from among the plurality of the beamformer networks includes at least two delay elements, where the at least two delay elements include a phase shifter, a time delay, or a combination thereof. The single port antenna is coupled to the at least two delay elements of a corresponding beamformer network from among the plurality of beamformer networks.

In one form, the front-end antenna system further comprises a controller configured to independently control radiation parameters and a beam type of the one or more beams. The radiation parameters comprise a direction, a pattern, a power, a polarization, a phase angle, frequency band, or a combination thereof. The beam type includes one of a transmit type beam, a receive type beam, and a simultaneous receive and transmit type beam.

In one form, the one or more beam networks include the switching network, and the switching network includes one or more switches, one or more combiners, one or more splitters, one or more coupling lines, one or more filters, or a combination thereof.

In one form, the one or more beam networks are configured to form the one or more beams at the RF stage, the IF stage, the digital stage, a local oscillator stage, or a combination thereof.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 11:
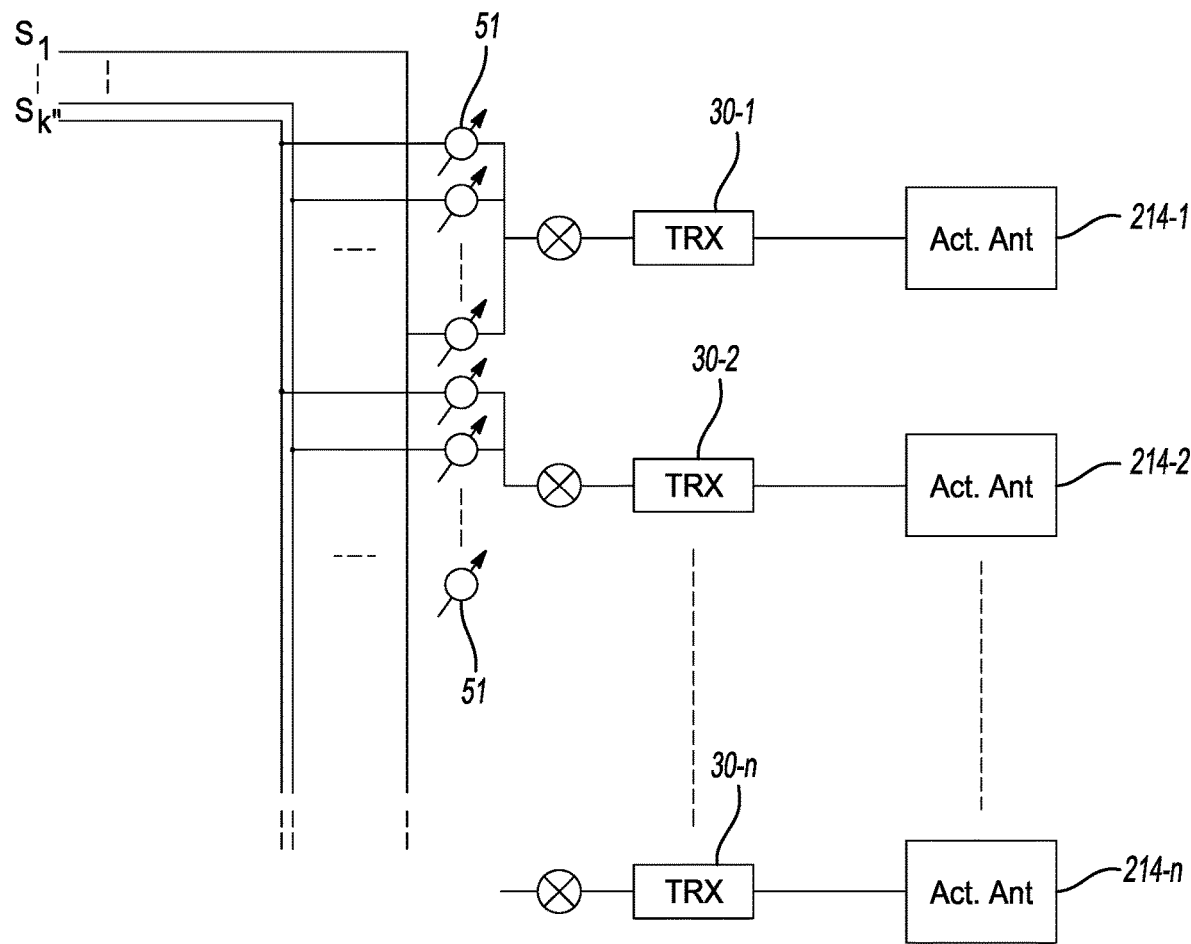
Figure 12A:
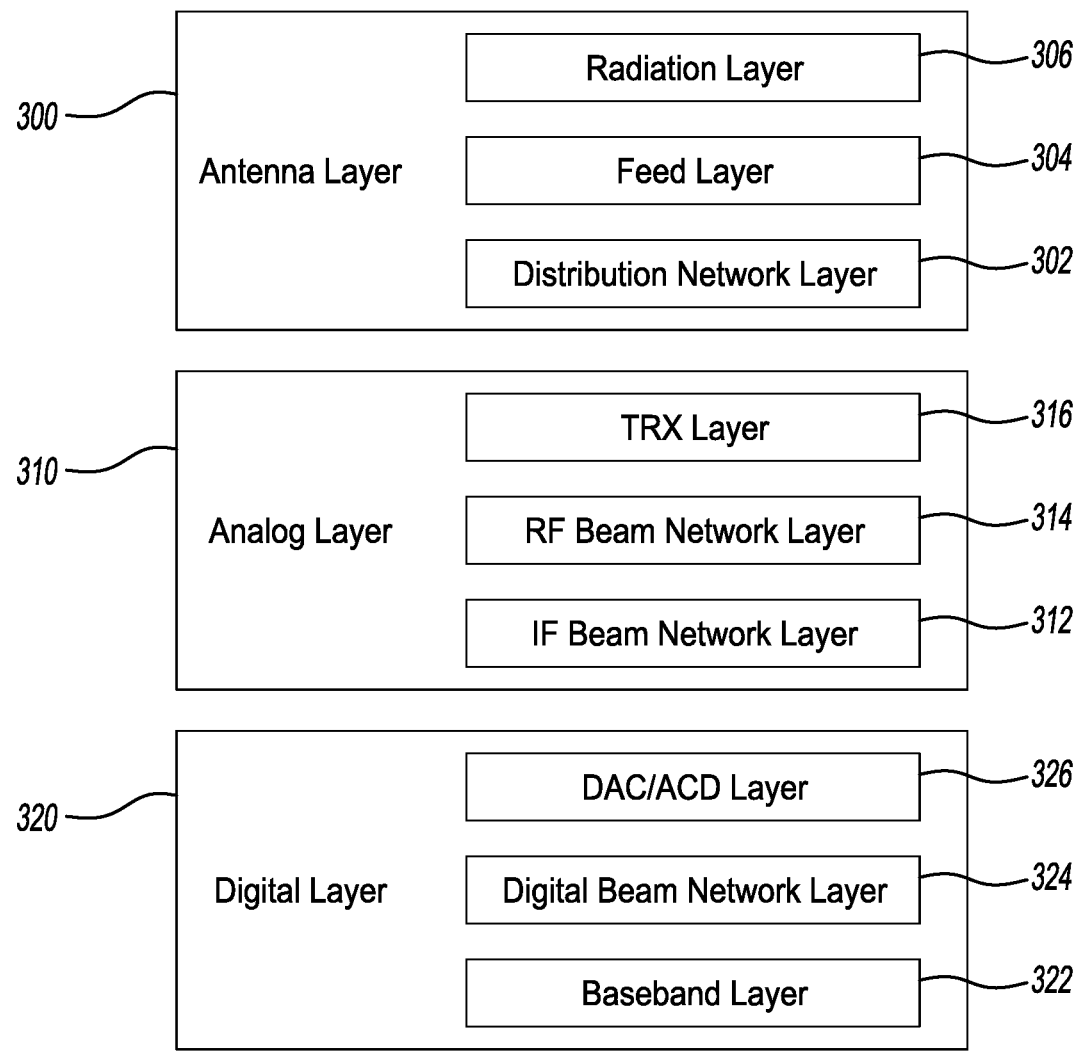
Figure 12B:
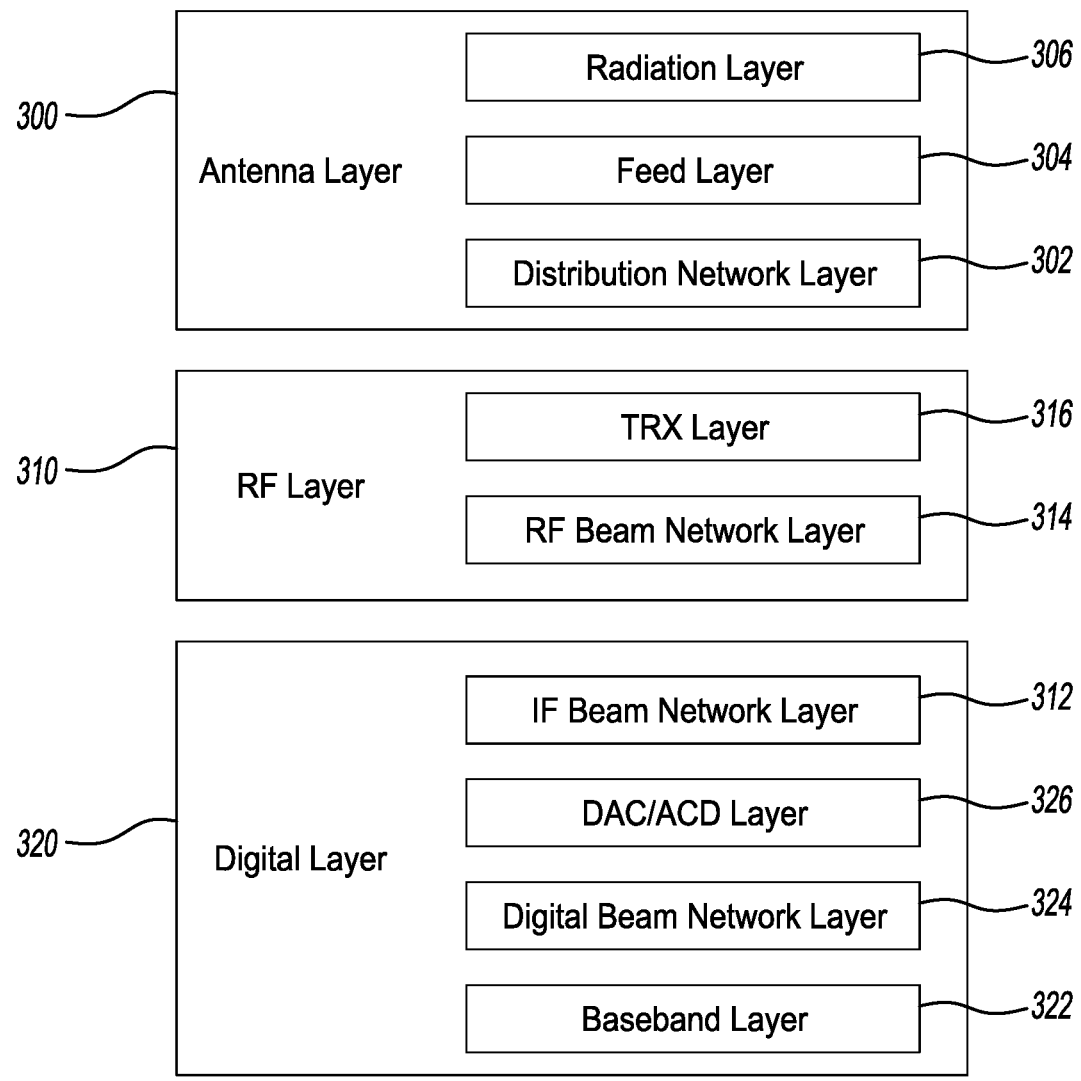
Figure 12C:
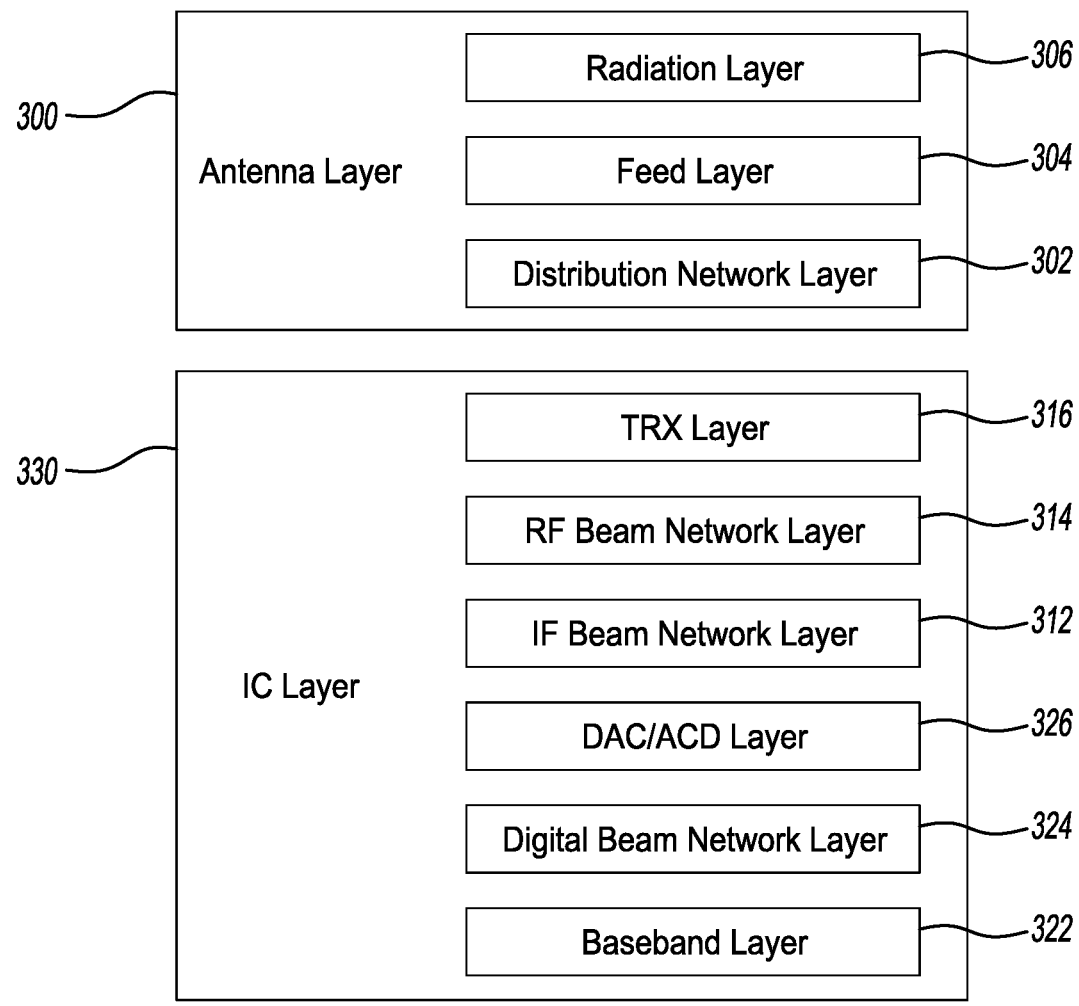
Figure 13:
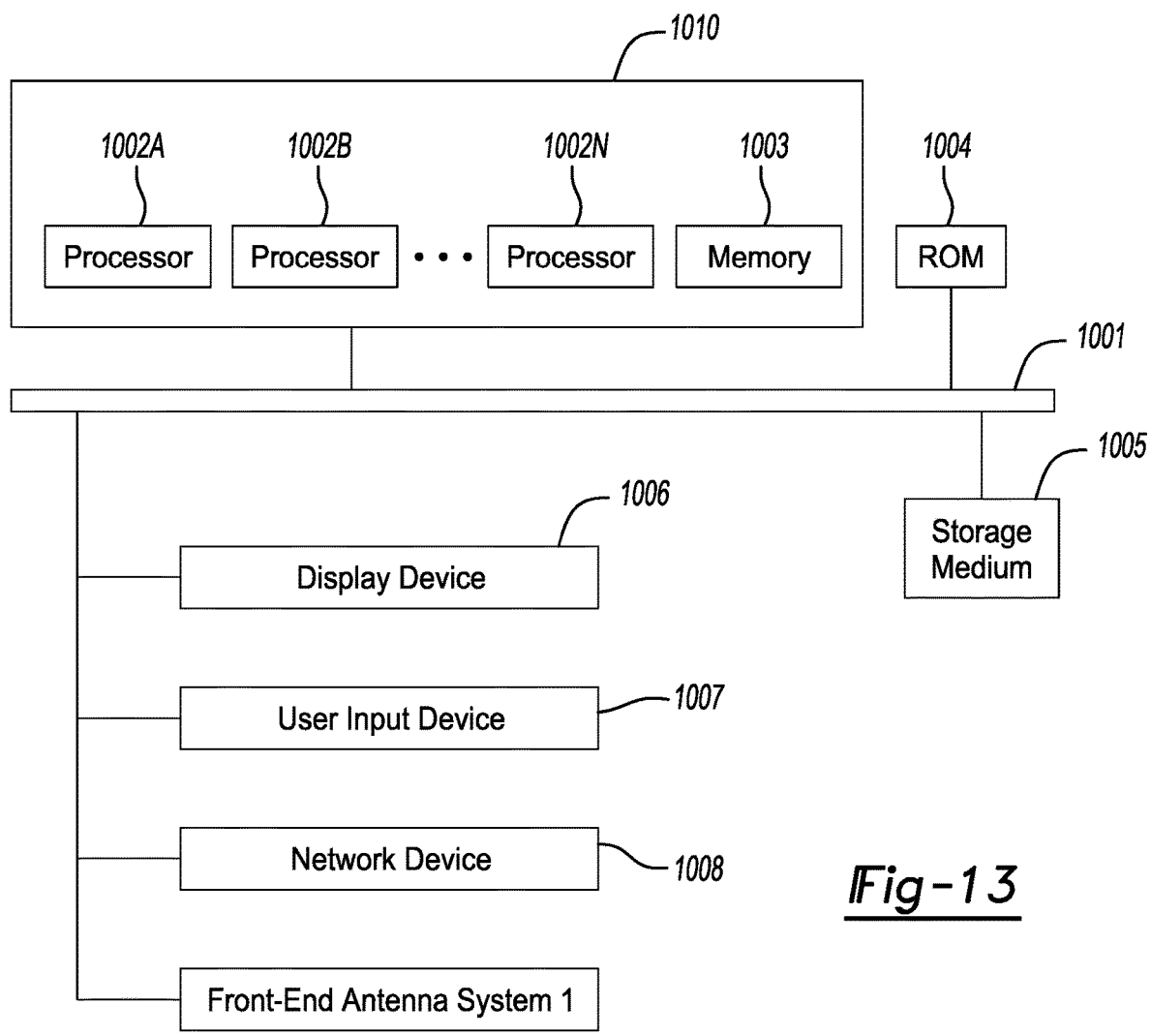

FIG. 11 a schematic illustration of a system that includes a set of antennas according to the teachings of the present disclosure;

FIG. 12A is a functional block diagram of a front-end antenna system according to the teachings of the present disclosure;

FIG. 12B is a functional block diagram of another front-end antenna system according to the teachings of the present disclosure;

FIG. 12C is a functional block diagram of yet another front-end antenna system according to the teachings of the present disclosure; and FIG. 13 is a functional block diagram of a front-end antenna system and a controller according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a front-end antenna system architecture technology for a wireless front-end transceiver that provides a unique combination of multi-beam beamforming, high power-efficiency, high spectral-efficiency, and scalability in operation frequency and size. The front-end antenna system operates as a wireless front-end system that enables generation and/or reception of beams and electronic control of radio frequency (RF) pattern and beams with high precision and independent control of a various radiation parameters, such as a direction, a pattern, a power, a polarization, and/or a phase angle of the beam. In one form, the front-end antenna system transmits, receives, or concurrently transmits and receives one beam (e.g., single beam operation/mode) or multiple simultaneous beams (e.g., multi-beam operation/mode). In one form, the front-end antenna system includes at least one of a radio frequency (RF) stage, an intermediate frequency (IF) stage, and a digital stage. While specific stages are provided the front-end antenna system may include other stages such as a local oscillator stage.

The front-end antenna system of the present disclosure may be implemented for various types of signal or power radio wave transmission and/or reception, such as front-end antenna systems, wireless sensing and imaging systems, and wireless power transfer systems, among others. Examples of front-end antenna systems include, but are not limited to: satellite signaling, wireless communication for network operators and internet service providers (ISPs), broadband, and/or general telecommunication. Example wireless sensing and imaging sensing systems include, but are not limited to: automotive radar sensor systems, security and safety imaging and screening sensor systems, medical imaging systems, among others. Example wireless power transfer systems include, but are not limited to: systems that use radio wave to transfer power/energy for wireless charging of electronic and electrical devices.

In one form, the front-end antenna system may be implemented for millimeter-wave frequency band communications (e.g. 5G/6G telecommunications), where excessive signal propagation losses are mitigated with large apertures and/or large number of radiating elements (and the associated transceiver and beamforming circuitry). As a result of a large number of radiating elements, conventional front-end antenna systems consume excessive power (e.g., power consumption resulting from digital beamforming methods), are limited in their functionality (e.g. number of beams, antenna gain, beamforming capability, among others), and/or require complex beamforming networks (e.g. large die size and count, complex routing and synchronization between elements, among others) that limits the aperture size.

The front-end antenna system of the present disclosure may further be implemented in telecommunication frequency bands including mid-band and/or low-band 5G signaling bands), satellite communication bands (e.g. X-, Ku-, Ka-, V-, W-bands), automotive radar band (e.g. W-band), or other licensed or unlicensed frequency bands (e.g. 60 GHz). The front-end antenna system may also be implemented in other frequency bands (e.g. RF, microwave, millimeter-wave, sub-millimeter-wave, terahertz, among other frequency bands).

In the multi-beam mode, the phased-array front-end antenna system may function as a multi-input/multi-output (MIMO) signaling system that enables the simultaneous and continuous transmission (and/or reception) of multiple RF beams, with each beam capable of containing independent or correlated signals for enhanced communication and/or detection purposes. The multiple beams may also transfer power to multiple charging devices in a wireless power transfer system. The antenna system provides high precision shaping and control of each beams shape (e.g., pattern), pointing direction, power-level, polarization, etc., thereby enabling an operator to uniquely define the desired properties.

The front-end antenna system may provide various benefits. The system and method are not limited to always providing such benefits, and are presented only as exemplary representations for how the system and method may be put to use. The list of benefits is not intended to be exhaustive and other benefits may additionally or alternatively exist.

As an example, the front-end antenna system provides an increased information load capacity (e.g., aggregated throughput or data rate) in wireless communications. Multiple beams may provide for an increase in information transfer over a specific frequency band, thereby increasing the spectral efficiency and power efficiency.

As another example, the front-end antenna system provides multiple beams that may provide continuous and simultaneous connections with multiple nodes, thereby improving speed and enabling complex, multi-node communication or more efficient wireless communication topologies.

As yet another example, the front-end antenna system provides multi-beam MIMO operation for communications, thereby enabling spatial multiplexing methods for frequency reuse, increased capacity of the radio link, and improved spectral efficiency in the front-end antenna system.

Furthermore, conventional phased-array antennas only have a single beam, signal transfer with multiple locations that require beam hopping. As such, the multi-beam functionality provided by the phased-array antenna of the present disclosure provides continuous connections with multiple locations, thereby rendering beam hopping unnecessary.

The front-end antenna system of the present disclosure also provides for tracking moving signal sources, such as mobile phone users, planes, satellites, and cars, etc. Continuous connections provided by the front-end antenna system of the present disclosure enable continuous signal tracking and removing any delay required to track any signal, thereby minimizing the connectivity latency.

The front-end antenna system of the present disclosure may additionally provide overlapping signal beams in a given direction or between given nodes in a communication network. As such, the front-end antenna system provides added redundancy in the communication network.

As another example, the front-end antenna system provides simultaneous transmission and reception to one or multiple nodes, which in turn reduces the latency of the communication system and increases the data-rate of the communication network.

For imaging systems, the front-end antenna system of the present disclosure increases detection resolution (e.g., angular and/or range resolutions). Furthermore, the multi-beam operation of the front-end antenna system enables faster imaging and detection as opposed to, for example, single-beam beam-steering systems.

For wireless power transfer systems, the front-end antenna system of the present disclosure provides for the generation of multiple beams for simultaneous charging of multiple wireless devices. As such, the front-end antenna system reduces charging time and improves efficiency of each device.

As another example, the front-end antenna system of the present disclosure reduces the complexity, size, and power for any given aperture size and for both single beam as well as multi-beam operations. Furthermore, the front-end antenna system of the present disclosure reduces the overall die circuitry size and count requirements for the given aperture dimensions. As a result, the front-end antenna system provides for reduced size, reduced weight, and reduced power consumption in the system.

Figure 1:
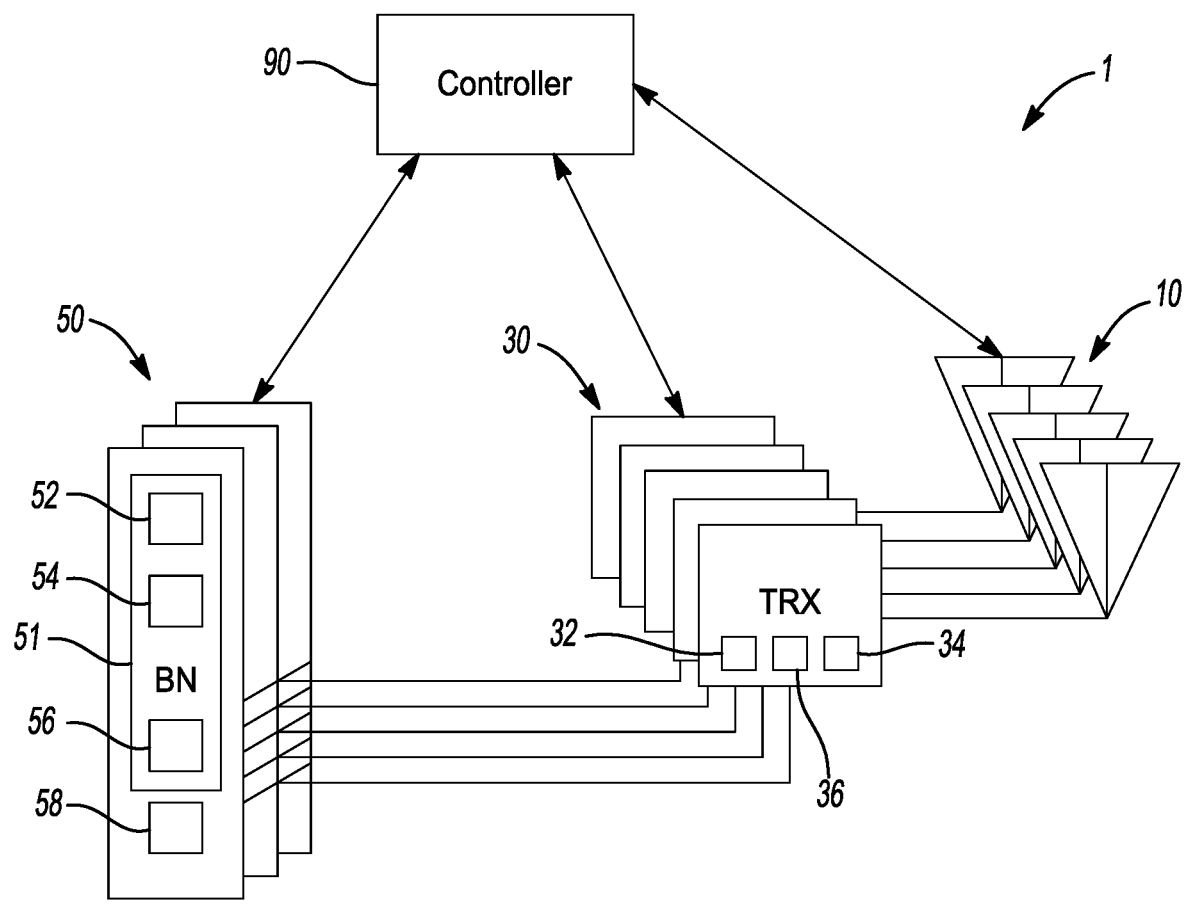
FIG. 1 is a schematic illustration of a front-end antenna system of an example embodiment according to the teachings of the present disclosure.

In one form, referring to FIG. 1, a front-end antenna system 1 includes a plurality of antennas 10, a plurality of transceivers 30, and a plurality of beam networks 50. In one form, the transceivers 30 electrically connect the antennas 10 to the beam networks 50. In one form, the front-end antenna system 1 is operable as a multi-input/multi-output (MIMO) system providing multiple simultaneous beams and is operable to independently control the signal beam radiation parameters, such as a direction, a pattern, a power, a polarization, and a phase angle of the beam. In one form, the front-end antenna system 1 is operable to independently control a beam type of the beams, such as a transmit type beam, a receive type beam, and a simultaneous receive and transmit type beam. the beam type includes one of a transmit type beam, a receive type beam, and a simultaneous receive and transmit type beam. In one form, the front-end antenna system 1 may be implemented for both digital and analog signaling.

In one form, the front-end antenna system 1 is configured to transmit and receive beams of radio waves. In one form, the front-end antenna system 1 transmits and/or receives multiple beams of radio waves having different directions, patterns, power-levels, among other radiation parameters that are defined by a beam management control routine. In one form, the front-end antenna system 1 simultaneously transmits and receives one or more beams of radio waves.

Figure 2:
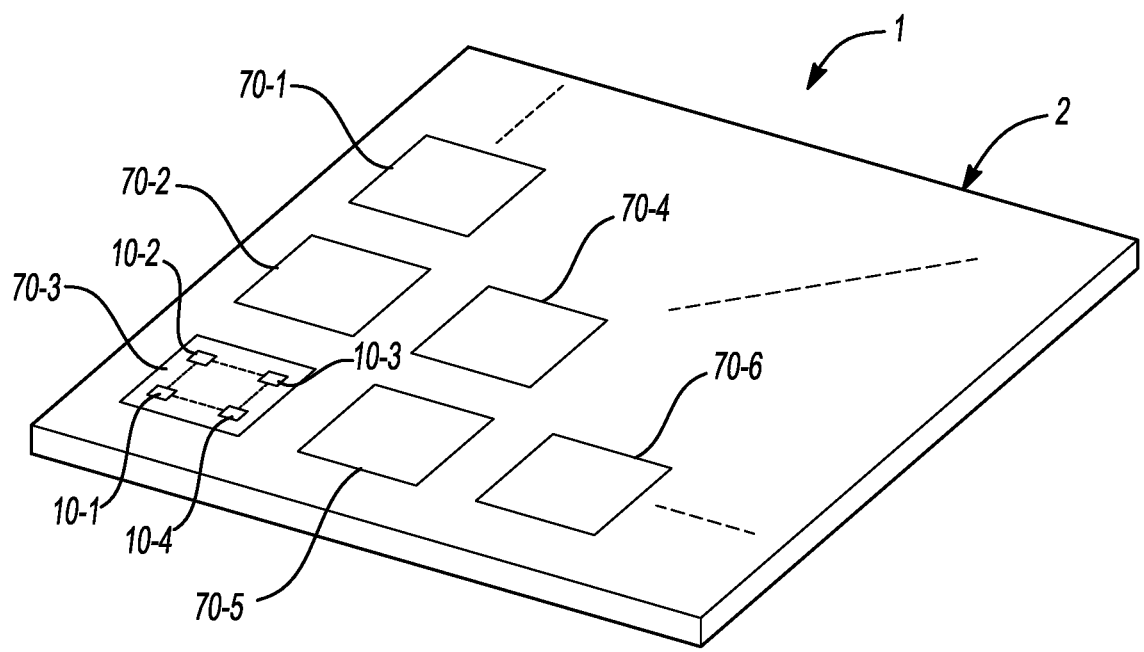
FIG. 2 is a schematic illustration of a subarray of the front-end antenna system according to the teachings of the present disclosure.

In one form, the front-end antenna system 1 may be implemented as an array (e.g., a dynamic array, a fixed array, an active array, a passive array, a digital array, an analog array, or a hybrid array, among other array types). As an example and as shown in FIG. 2, the front-end antenna system 1 may include one or more subarrays 70-1, 70-2, 70-3, 70-4, 70-5, 70-6 (collectively referred to herein as subarrays 70) that collectively form an array 2. Each of the subarrays 70 includes a set of one or more of the antennas 10 from among the plurality of antennas 10. As an example, the subarray 70-1 may include a set of antennas that includes antennas 10-1, 10-2, 10-3, 10-4 from among the plurality of antennas 10. In form, the subarrays 70 are coupled to each other via signal distribution networks (described below in further detail), the plurality of beam networks 50, the plurality of transceivers 30, or a combination thereof.

In one form, the one or more arrays 70 may be identical or dissimilar to each other. As an example, each subarray 70 may have the same geometric parameters (e.g., shape, size, orientation, length, width, depth, etc.), as shown in FIG. 2B. As another example, two or more of the arrays 70 may have a set of geometric parameters that are dissimilar to each other, as shown in FIG. 2A. In one form, the subarrays 70 are randomly arranged or are arranged in a grid or line. In one form, the one or more subarrays 70 may have various planar, non-planar, or conformal shapes (e.g., rectangular, circular, hexagonal, etc.). Additionally, the one or more subarrays 70 may be integrated with each other in a planar fashion, non-planar fashion, or a conformal fashion. In one form, the one or more subarrays 70 may interleave or overlap each other. In one form, the one or more subarrays 70 form a sparse configuration to expand the front-end aperture, and the one or more subarrays 70 may be rotated and shifted with respect to each other to suppress sidelobes.

In one form, the size and geometry of the front-end antenna system 1 may be based on the number of array antennas, the number of elements of each antenna, and/or dimensions of a continuous aperture antenna. In one form, the size and geometry of the front-end antenna system 1 are based on a desired signal strength, frequency bandwidth, signal load capacity, number of incoming/outgoing signals, among other signal transmission and/or reception parameters. As an example, in a 5G implementation, the front-end antenna system 1 includes the array 2 having 236 elements (e.g., 16×16 array) or 1024 elements (32×32 array). As another example, in a long-distance communication implementation, the array 2 includes 2000 elements (or an equivalent of 2000 element size when the antennas 10 are implemented by a continuous aperture antenna sub-array).

Referring to FIGS. 1-2, the antennas 10 are configured to control the radiation parameters of the front-end antenna system 1, such as a wave/signal beam pattern(s), direction(s), among other radiation parameters. Example antennas 10 include, but are not limited to: planar antennas (such as patches, slots, rings, spirals, bow-ties, etc.), cavity-backed antennas, and membrane antennas.

In one form, the set of antennas 10 of the subarray 70 may include a single antenna element, a set of radiating elements, or a continuous radiating aperture. As an example, the set of antennas 10 includes aperture antennas, continuous aperture antennas, planar antennas, lens antennas (e.g., an elliptical lens, a Lunenberg lens, etc.), planar lens antennas (e.g., a Rotman lens), wire antennas, and/or reflector antennas. As another example, which may include metamaterial antennas, leaky-wave antennas, Fabry-Perot antennas, slot array antennas, waveguide antennas, among others. As a specific example, the grouped elements may include metamaterial antennas having metamaterial elements or meta-pixels that are arranged to generate the desired pattern and radiation property for each subset antenna.

In one form, the set of antennas 10 further includes a signal distribution network. Example signal distribution networks include, but are not limited to: leaky-wave or slot-couples waveguide structures (e.g., air-filled waveguides, substrate integrated waveguides, among others), cavity structures (e.g. air-filled or dielectric-filled with custom shapes), a beamforming matrix structure (e.g., a Butler Matrix, a Hybrid Coupler, a Quadrature Coupler, a Blass Matrix, a Beamswitch Matrix, etc.), a microstrip structure, an H-tree structure, etc.

In one form, the set of antennas 10 may include a single port antenna or multiport antenna, and any number/combination of single port and multiport antennas may be included. As an example, for a multiport implementation of the antenna 10, each port may excite and create a beam in a specific region, where the beams collectively span a select 3D Field-of-View (FoV) space. In one form, the beams of a multi-port antenna may have overlapping regions/patterns. The generation of the multi-beam pattern of the front-end antenna system 1 may be implemented by the multiport antenna sets, the array of antenna sets, or a combination thereof via the beam networks 50.

In one form, the antennas 10 may be passive antennas or active antennas. As an example, the antennas 10 may include an active antenna having tunable components (such as varactors, diodes, etc.) and/or tunable materials, (e.g. barium strontium titanate (BST), liquid crystal, etc.) integrated therein for dynamic control of a given antenna property (e.g. antenna pattern, beam pattern, etc.). In some forms, the active antenna is electronically controlled by a controller to create the desired radiation property, as described below in further detail.

In one form, the antennas 10 may be configured to perform additional beamforming operations. As an example, when the antennas 10 are multiport antennas, the front-end antenna system 1 may include at least one set of switching networks that connect the set of antennas and other system components, thereby enabling control functionality of the ports of the multiport antennas, as described below in further detail. As an example, the multiport antennas are operable to transmit the plurality of beams, receive the plurality of beams, or a combination thereof such that the plurality of beams have a same polarization, a same frequency band, or a combination thereof. An example of the antennas 10 is provided in Applicant's concurrently filed co-pending application titled "ANTENNA SYSTEM FOR A MULTI-BEAM BEAMFORMING FRONT-END WIRELESS TRANSCEIVER" which is commonly owned with the present disclosure and the contents of which are incorporated herein by reference in its entirety.

Referring to FIG. 1, the transceivers 30 are configured to selectively enable the antennas 10 to transmit/receive signals, directional beams, and/or multi-dimensional beams by connecting the antennas 10 to the beam networks 50. In one form, the transceivers 30 are implemented as sets of transceivers 30, where at least one transceiver 30 from a given set of transceivers connects one antenna 10 from the set of antennas to a set of beam networks 50. In one form, at least one transceiver 30 from a given set of transceivers connects one antenna 10 from the set of antennas to a set of beam networks 50. In one form, the number of transceivers 30 connecting to each antenna 10 is equal to the number of ports of the antenna 10. In one variation, the number of transceivers 30 connecting to each antenna 10 may be unequal to the number of ports of the antenna 10.

In one form, the transceivers 30 each include two or more amplifiers that amplify incoming and outgoing signals, such as a power amplifier 32 and a low noise amplifier 34. In one form variations, the transceivers 30 may include one or more switches 36 that enable switching between the power amplifier 32 and the low noise amplifier 34 and thus, enable switching between receiving and transmitting signals. Alternatively, the power amplifier 32 and the low noise amplifier 34 may be connected to the antenna ports of the antennas 10 without the switches 36 to enable simultaneous Tx/Rx and/or to omit the losses associated with the switches 36.

In one form, the low noise amplifier 34 is configured to amplify a signal received by the antenna 10 while adding minimal noise/distortion to the signal. The low noise amplifier 34 may have various gain, noise figures, linearity, and impedance matching properties. In one form, the power amplifier 32 is configured to amplify the signal to a given power level for the antenna port. As such, the power amplifier 32 may have gain and power properties to amplify the signal to the given power level in accordance with the desired equivalent isotopically radiated power (EIRP) in the given direction/beam. In one form, the power amplifier 32 has high linearity and power-efficiency to support various modulated signals, such as orthogonal frequency-division multiplexing modulation. In some forms, the power output by the power amplifiers 32 may be enhanced using various techniques including, but not limited to, impedance transformation approaches, power combining techniques, and transistor stacking. These techniques may be implemented off-chip or on-chip, such as advanced silicon-based processes (e.g., bulk CMOS sub-um, silicon on insulator (SOI), and/or SiGe BiCMOS techniques).

As an example, the power amplifier 32 may be a Doherty power amplifier, an outphasing power amplifier, a Chireix outphasing power amplifier, or a combination thereof. As another example, the power amplifier 32 may be a linear-type power amplifier (e.g., class A amplifier, class B amplifier) or a switching-type power amplifier (e.g., Class E amplifier, Class $F^{-1}$ amplifier). As an additional example, the power amplifier 32 is a high-power amplifier that compensates for signal propagation attenuation losses and high RF losses of the front-end antenna system 1 when it is implemented in, for example, high-frequency millimeter-wave systems (i.e., high frequency includes 30 to 300 gigahertz).

In one form, the power amplifier 32 may include a predistortion circuit to improve the output signal linearity. The predistortion circuit may be implemented in the digital stage, the analog stage, or a combination thereof. In one example, the predistortion circuit is implemented in the digital stage and is a digital predistortion circuit (DPD circuit). In one form, DPD circuits may be based on memoryless models (e.g., memoryless polynomial algorithms and/or look-up table (LUT) based algorithms) or models with memory (e.g., a memory polynomial model). In another example, the DPD circuit is implemented based on information from one or more beams of the front-end antenna system 1 as opposed to the information from each power amplifier 32.

In one form, the beam networks 50 include a beamformer network 51 and/or switching networks 58 that are configured to generate, provide, and/or alter signal streams (both incoming and outgoing) by constructive and destructive combination, selection, and/or manipulation of the signals to/from the antennas 10. The beam network 50 is configured to designate particular signal phases, amplitudes, and/or selection alternations in each signal path from each antenna 10 and/or set of antenna 10 for beamforming combining/processing for the desired signal streams/beams. While the beam network 50 is shown as including both of the beamformer network 51 and the switching network 58, it should be understood that the beam network 50 may include only one of the beamformer network 51 and the switching network 58 in some variations.

In one form, the beam networks 50 are provided in sets. Each set of the beam networks 50 is configured to generate multi-directional and/or multi-dimensional beams for multi-beam, multi-stream signal transmission and/or reception. The set of beam networks 50 is connected to each antenna 10 of a given set of antennas 10 via the transceivers 30. In one form, the beam networks 50 and/or the components thereof may be implemented at various stages, including the RF stage, the IF stage, the baseband stage, the digital stage, or a combination thereof. In some forms, the beam networks 50 may be combined with the antennas 10 for hybrid beam networks when the antennas 10 include active antennas.

In one form, the beamformer network 51 includes a network of phase shifter (PS) circuits 52, a network of time delay circuits 54, an amplifier network 56, splitters, combiners, or a combination thereof. In one form, the network of phase shifter circuits 52 (hereinafter referred to as "phase shifters 52") are configured to receive an incoming signal and change the phase and amplitude of the beam related to the incoming signal. In one form, the phase shifters 52 may be implemented by analog circuits, digital circuits, or a combination thereof (e.g., a hybrid model). The phase shifters 52 may include active components (e.g., vector modulator-based phase shifters 52), passive components, or a combination thereof. As an example, the phase shifters 52 may include a reflection-type phase shifter (RTPS), a loaded line phase shifter, a switched-transmission line phase shifter (STPS), a loaded line-based passive phase shifter, or a combination thereof. In one form, delay variation cancellation techniques may be implemented to inhibit delay variations over a given fractional bandwidth (e.g., a fractional bandwidth greater than or equal to 20%).

In one form, the network of time delay circuits 54 (hereinafter referred to as "time delays 54") are also configured to receive an incoming signal and change the phase of the beam related to the incoming signal. As an example, the time delays 54 are configured to delay the signal by a controllable time delay that is defined and/or dynamically adjusted by a controller. In one form, the time delays 54 may be implemented by analog circuits, digital circuits, or a combination thereof (e.g., a hybrid model).

In one form, the phase shifters 52 and/or the time delays 54 are implemented as a true-time delay (TTD) to minimize beam squint or distortion of the beamformer networks 51. In one form, the phase shifters 52 and the time delays 54 may be collectively referred to herein as "delay elements."

In one form, the beamformer networks 51 include the amplifier network 56 when the beamformer networks 51 are implemented by analog circuitry. The amplifier network 56 is configured to modify the amplitude of a received or transmitted signal such that the signal is at a given strength before/after signal combining, splitting, and/or manipulation is performed. As an example, the amplifier network 56 may include one or more variable gain amplifiers that are implemented as an analog circuit, a digital circuit, or a combination thereof (e.g., a hybrid model).

In some forms, the beam networks 50 include the switching network 58 when, for example, the antennas 10 include multiport antennas. As an example, for each multiport antenna, the front-end antenna system 1 includes a switching network 58 that connects a subset of the multiport antenna ports to a set of transceivers 30. Additionally or alternatively, the front-end antenna system 1 may include a switching network 58 that connects the set of transceivers to the set of beamformer networks 51. In some forms, the switching network 58 connects all ports of the single-port/multi-port antennas to the transceivers 30 without any switching circuits. The switching network 58 is configured to provide different levels of component connectivity/activity, thereby consolidating or splitting beams and controlling beam direction. The switching network 58 may simplify the complexity of the beamformer and/or significantly increase the beamforming multi-beam, multi-stream functionality of the front-end antenna system 1. The switching network 58 may be implemented at various stages, such as the RF stage, the IF stage, the baseband stage, the digital stage, or a combination thereof. In one form, the switching network 58 includes one or more switches, one or more combiners, one or more splitters, one or more filters, one or more coupling lines, or a combination thereof.

In one form, the beamformer networks 51 may be an analog beamformer, digital beamformer, or a combination thereof (e.g., a hybrid beamformer). As an example, for large antenna apertures with large number of antenna elements/sets, the beamformer network 51 may be an analog beamformer or a hybrid beamformer due to the excessive power consumption of a digital beamformer. As another example, at higher frequency bands (e.g., millimeter-wave band), the beamformer network 51 may include an analog beamformer that is provided at the IF stage to inhibit losses of RF components and distribution/combination networks and/or the size of RF components at higher frequency bands. In some forms, where an IF implementation or a digital beamformer is employed, synchronization of Local Oscillator (LO) signals may be performed at all antenna elements and/or antenna sets, along with implementation of mixers at antenna set and/or sub-set level. In some forms, the LO signal synchronization may be implemented by a reference signal, a Phase-Locked Loop (PLL) circuit, an amplifier circuit, a mixer, or a combination thereof implemented at antenna elements, antenna sets, and/or antenna sub-set levels.

In some forms, the front-end antenna system 1 may include a controller 90. The controller 90 is configured to operate the components of the front-end antenna system 1 to achieve a desired output. In one form, the controller 90 is connected to all active components and is configured to perform beam management control routines, beam-tracking routines, user management routines, among others. As an example, the controller 90 may independently set a power-level, bandwidth, beam direction, beam width, polarization, number of streams/users, communication range and modulation, among other signal parameters for one or more of the beams. In one form, the controller 90 may be automated such that the system responds in a specific manner to input and output signals to and from the front-end antenna system 1. In one form, the controller 90 enables user management of any and/or all desired front-end antenna system parameters (e.g. level of signal amplification, setting beam form and directions). In one form, the controller 90 enables management of the signal flow in a communication network.

In example variations, the components of the front-end antenna system 1 (e.g., the antennas 10, the transceivers 30, the beam networks 50, and/or the controller 90) are distributed on one or more electronic chips (e.g., an integrated circuit (IC) chip) and/or one or more substrate layers thereof. The IC chip may include baseband, digital, modem, and/or control circuitry in a system-on-a-chip (SoC) configuration for performing the functionality described herein. In one form, each IC chip is associated with a single antenna element and/or set of antennas 10. In one form, each IC chip is associated with multiple antenna elements or subarrays 70. In one form, one IC chip is associated with all antenna elements or sets of antennas 10.

Figure 3:
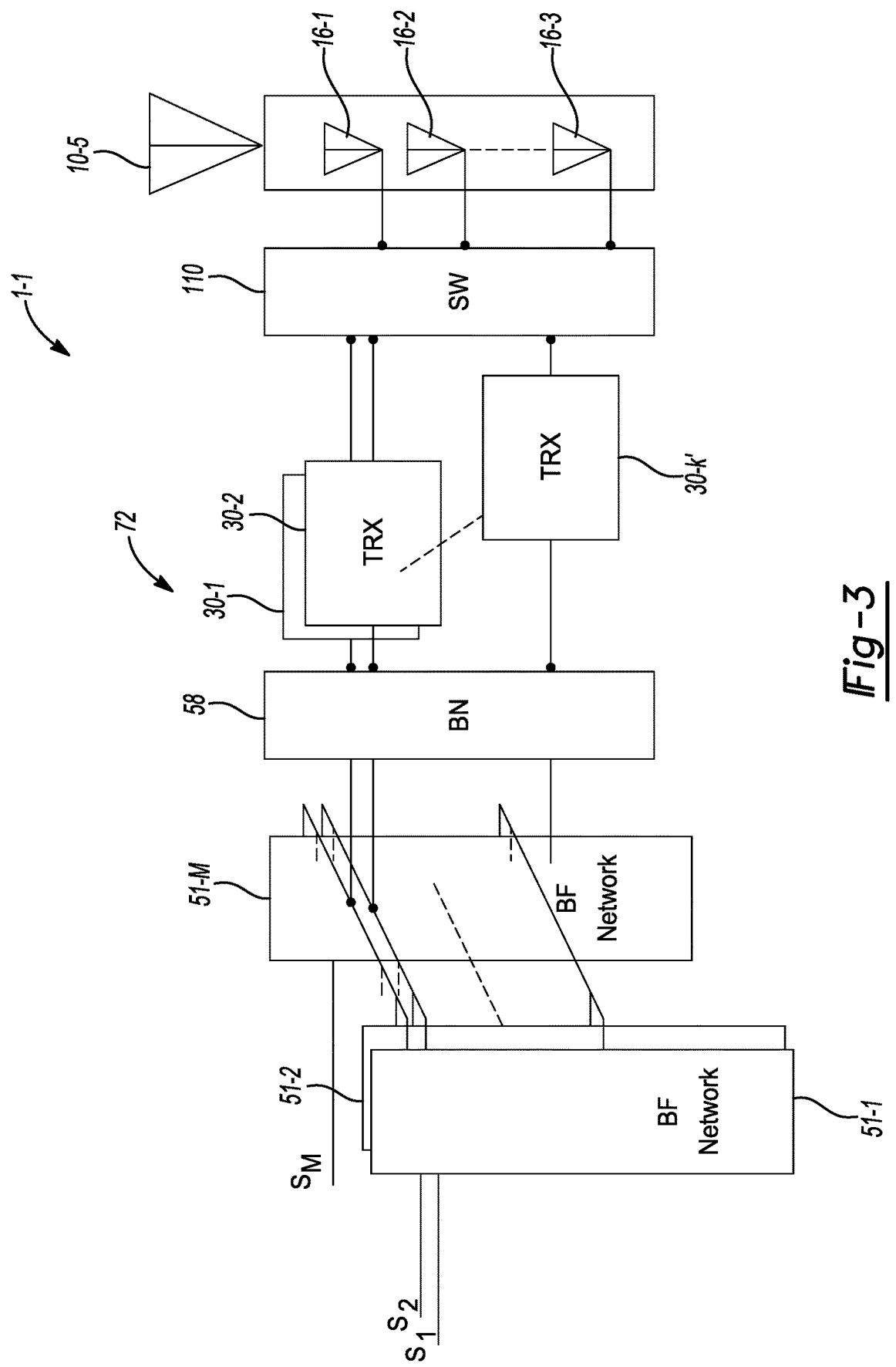
FIG. 3 is a schematic illustration of another example front-end antenna system according to the teachings of the present disclosure.

Referring to FIG. 3, front-end antenna system 1-1 is shown. The front-end antenna system 1-1 is similar to the front-end antenna system 1, but in this variation, the front-end antenna system 1-1 includes one or more subarrays 72 including a multiport antenna 10-5 having ports 16-1, 16-2, . . . 16-$k$ connected to a set of transceivers 30-1, 30-2, . . . 30-$k'$. Accordingly, each subarray 72 includes the multiport antenna 10-5 having k ports, and each subarray 72 includes a set of k' transceivers.

In one form, each subarray 72 is connected to the beamformer networks 51-1, 51-2, . . . 51-M of the beam networks 50. In one form, the set of transceivers 30 is connected to each of the beamformer networks 51 to generate M signal streams via the switching network 58, thereby enabling the front-end antenna system 1-1 to perform beam combining, splitting, and switching routines. In one form, the multiport antenna 10-5 may be connected to the set of transceivers 30 by a switching network 110, which is similar to the switching network 58, thereby enabling the front-end antenna system 1-1 to switch the active ports of the multiport antenna 10-5 (e.g., to choose the direction(s) of the beam).

In one form, each subarray 72 includes n elements or an equivalent thereof based on the type of antenna (e.g., a metamaterial antenna or continuous aperture antenna). When each subarray 72 is identical, the front-end antenna system 1-1 has a total size of N=n×m elements (or an array system with the equivalent of N elements), where m represents the number of subarrays 72 or antenna sets in the front-end antenna system 1-1. In other words, an N element array may be grouped into subarrays 72 of n elements each. These subarrays 72 may function in adding an example grouping to the array components for system manufacture. For example, in some example variations, the drivers for the subarrays 72 may be assembled onto a single RFIC or a set of RFICs.

In one form, the multiport antenna 10-5 (or a single port antenna) has various functionalities (e.g., active, passive, high-gain or low-gain, pencil-beam or fan-beam or broad-beam, among others) and/or types (e.g., metamaterial antenna). When the multiport antenna 10-5 (or the single port antenna) is a passive antenna, the number of elements n of each array may correspond to a number of antenna ports k. As an example, n and k may be equal or of the same order magnitude. As another example, k may be on the order of $\sqrt{n}$.

In one form, the set of transceivers 30 of the front-end antenna system 1-1 include one or more transceivers 30. In some forms, the number of transceivers 30 is less than or equal to the number of antenna ports k.

Figure 4:
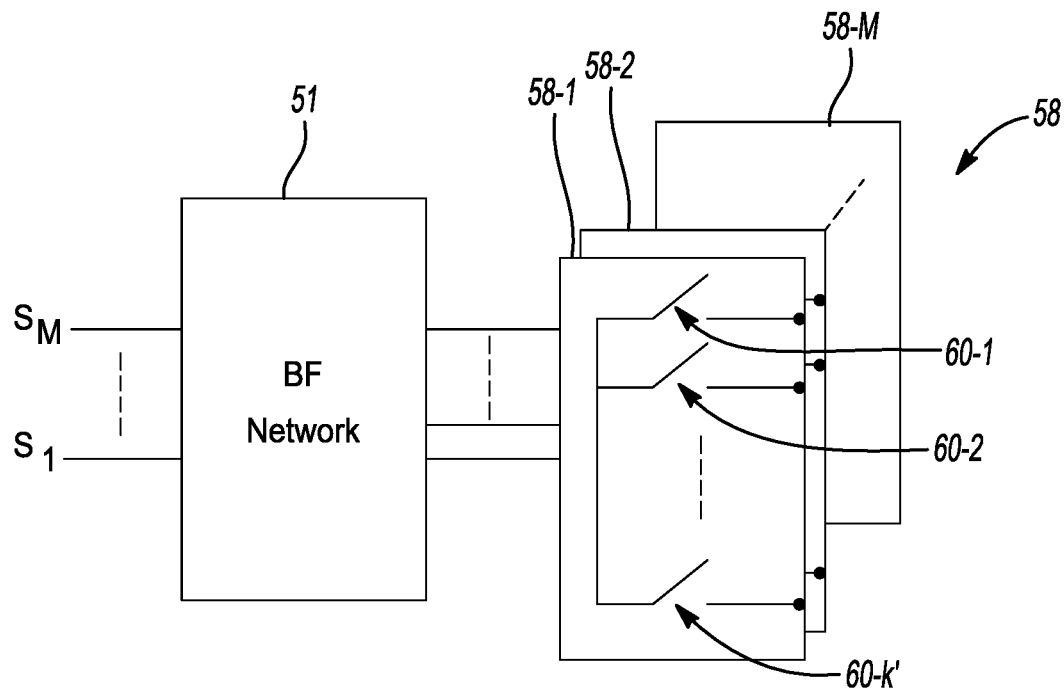
FIG. 4 is a schematic illustration of an example switching network connected to a set of beamformers according to the teachings of the present disclosure.

Referring to FIG. 4, the beamformer networks 51 and switching networks 58-1, 58-2, . . . 58-M (collectively referred to as the "switching networks 58") are shown. In one form, the beamformer networks 51 and the switching networks 58 are connected to k' transceivers 30. In one form, for M beams and k' transceivers 30, the switching networks 58 each include switches 60-1, 60-2, . . . 60-$k'$ (collectively referred to as the "switches 60"). In one form, each beam is connected to one of the switching networks 58, and the one switching network 58 is connected to each of the k' transceivers 30 via the switches 60. As an example, the switch 60-1 of the switching network 58-1 is connected to transceiver 30-1, the switch 60-2 of the switching network 58-1 is connected to transceiver 30-2, and the switch 60-$k'$ of the switching network 58-1 is connected to transceiver 30-$k'$. In one form, the front-end antenna system 1 may include k' switching networks 58 each having M switches 60, and each of the switching networks 58 is connected to one of the transceivers 30, which is connected to all of the phase shifters 52 by a switch located therein.

In one form, the beamformer networks 51 may have different characteristics at different stages and have particular applicability to specific frequency bands (e.g., millimeter-wave band). As an example, the analog beamformers may be implemented at the radio frequency (RF) stage, at the intermediate frequency (IF) stage, the LO stage, or a combination thereof.

In one form, when the beamformer networks 51 are implemented at the RF stage (i.e., RF beamforming), one of the phase shifters 52, the time delay circuits 54, a variable gain amplifier 62, and a signal combiner 64 may be provided for each beam of each signal path. In one form, each phase shifter 52 and variable gain amplifier 62 changes an RF signal to a desired phase and amplitude within the RF band. The signal combiner 64 then combines the modified signals of each beam and port.

In one form, when the beamformer networks 51 are implemented at the IF stage (i.e., IF beamforming), one of the phase shifters 52, the time delay circuits 54, the variable gain amplifier 62, the signal combiner 64, and a mixer 66 may be provided for each beam of each signal path. The phase shifter 52 and variable gain amplifier 62 change an IF signal, which is generated by converting the RF signal to the IF band, to a desired phase and amplitude. The signal combiner 64 then combines the modified signals of each beam and port, and the mixer 66 combines the input signal with the LO signal to convert the signal to the IF band. The LO signal is distributed and synchronized for all antennas and/or beamformers.

In one form, when the beamformer networks 51 are implemented at the LO stage (i.e., LO beamforming), one of the phase shifters 52 (e.g., phase rotators or vector modulator-based phase shifters), the time delay circuits 54, the variable gain amplifier 62, and the mixer 66 may be provided for each beam of each signal path. The phase shifter 52 and the variable gain amplifier 62 change the phase and/or amplitude of the LO signal for each beam of each port, and the mixer 66 mixes the RF signal with the modified LO signal and converts it to the IF band in accordance with a desired phase and amplitude. In one form, the variable gain amplifier 62 is provided in the IF or LO path. In one form, the phase shifter 52 may be integrated with the mixer 66.

In one form, when the beamformer networks 51 are implemented at the digital stage (i.e., digital beamforming), one of the phase shifters 52, the time delay circuits 54, the variable gain amplifier 62, the signal combiner 64, a mixer 66, a digital-to-analog converter (DAC) 68, and an analog-to-digital converter (ADC) 69 may be provided for each beam of each signal path. In one form, the IF signal is converted from an analog signal to a digital signal using the ADC 69 during a receive mode, and the phase shifter 52, the time delay circuit 54, and the variable gain amplifier 62 change at least one of the phase, time delay, and/or amplitude of the digital signal. The signal combiner 64 then combines the modified digital signals of each beam and port. Similarly, during a transmit mode, the DAC 68 converts the digital signal to an analog signal, and the phase shifter 52, the time delay circuit 54, and the variable gain amplifier 62 change at least one of the phase, time delay, and/or amplitude of the analog signal. The signal combiner 64 then combines the modified analog signals of each beam and port.

In one form, when the beamformer networks 51 are implemented at the combination of the IF and digital stages in a hybrid beamformer, one of the phase shifters 52, the time delay circuits 54, the variable gain amplifier 62, the signal combiner 64, and the mixer 66 may be provided for each beam of each signal path at the IF stage. The input/outputs from the IF beamformers are connected to digital beamformers, and one of the DAC 68, the ADC 69, the phase shifters 52, the variable gain amplifier 62, and/or the signal combiner 64 may be provided for each beam of each signal path. At each stage of the hybrid beamformer, the phase shifter 52 and the variable gain amplifier 62 are configured to change at least one of the phase, time delay, and/or amplitude of the signal. The signal combiner 64 then combines the modified signals of each beam and port.

Figure 5:
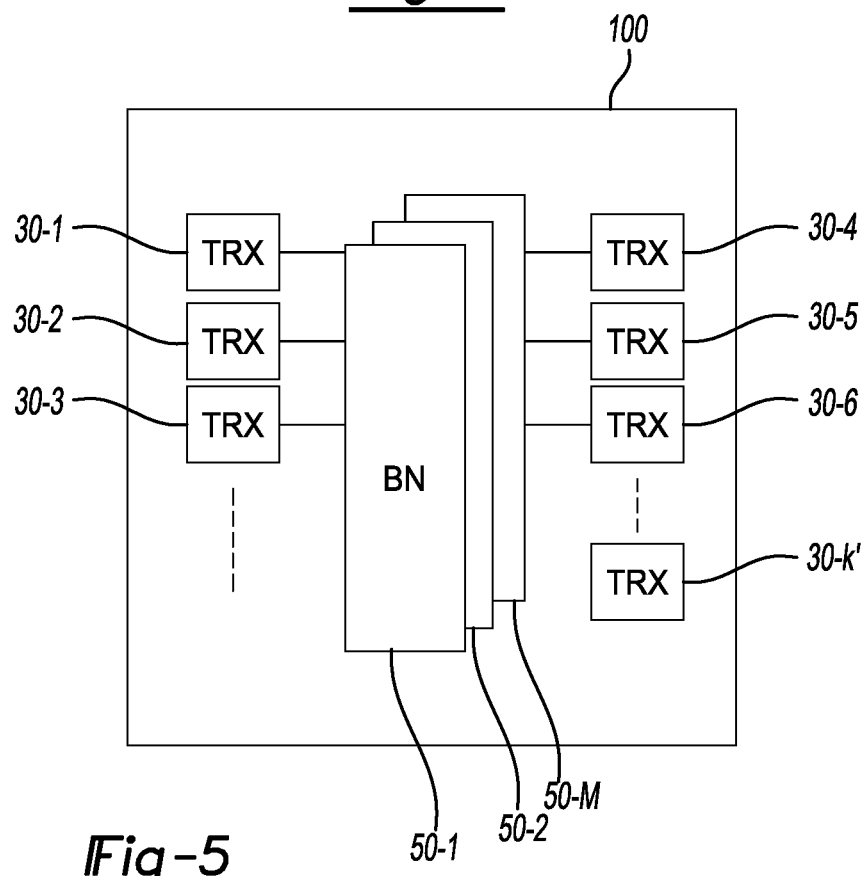
FIG. 5 is a schematic illustration of a radio-frequency integrated circuit according to the teachings of the present disclosure.

Referring to FIG. 5, an RFIC 100 including the M beam networks 50 and the k' transceivers 30' is shown. In one form, the RFIC 100 includes N elements (or the equivalent of N elements of the front-end antenna system 1. In one form, the M beam networks 50 are connected to the ports and/or elements of the antennas of the subarrays 70, thereby providing a modular, tileable front-end antenna system that is customizable and inhibits complexity and cost.

Figure 6:
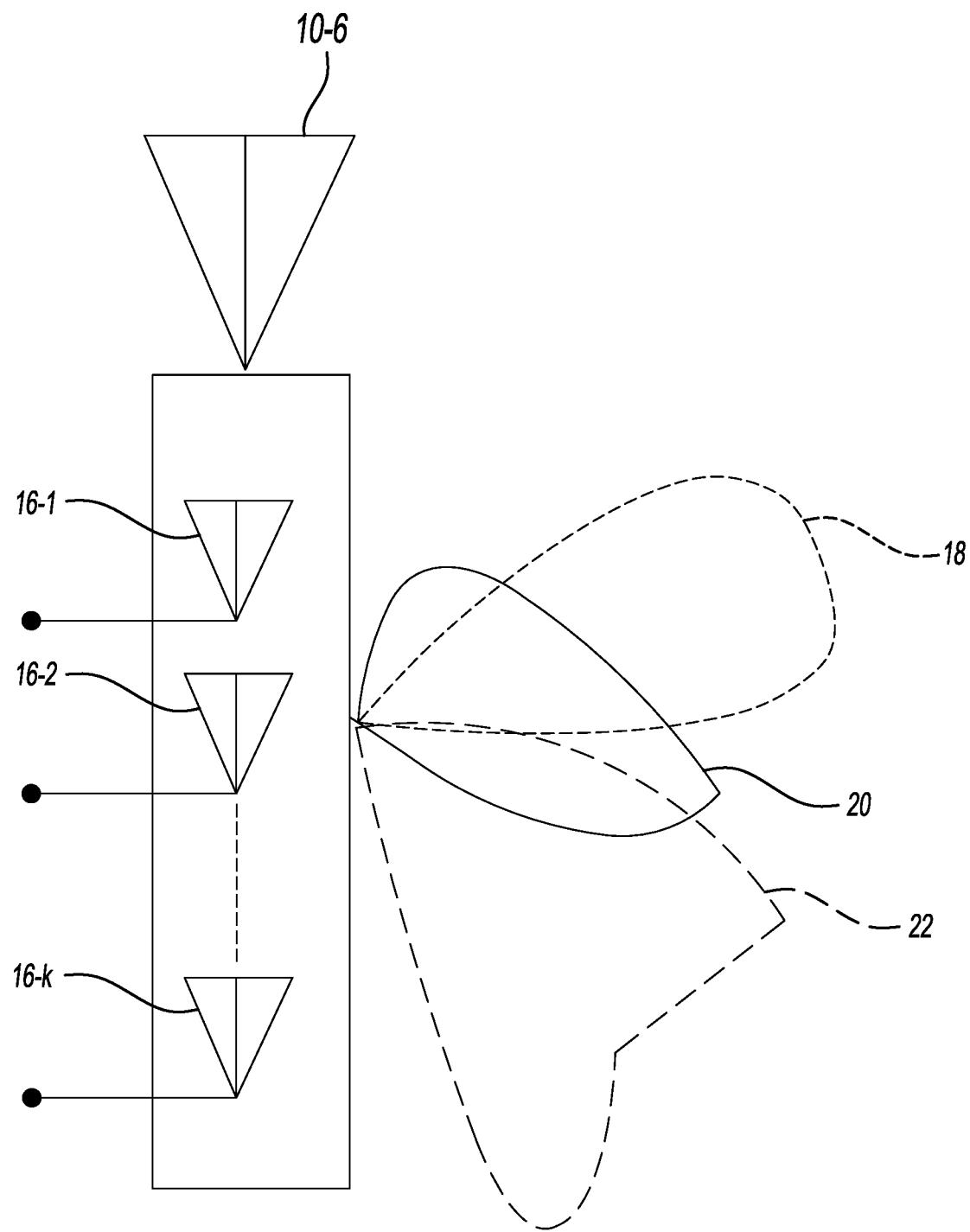
FIG. 6 is a schematic illustration of an example multiport antenna according to the teachings of the present disclosure.

Referring to FIG. 6, a schematic of beams 18, 20, 22 output by antenna 10-6, which may be a passive multiport antenna having ports 16-1, 16-2, . . . 16-k (collectively referred to as "ports 16"), is shown. In one form, exciting one of the ports 16 generates a corresponding beam having given radiation parameters, such as a pattern and direction. In one form, the beams 18, 20, 22 may overlap, but it should be understood that the beams 18, 20, 22 may not overlap in other forms. In one form, the beams 18, 20, 22 span a desired spatial region (e.g., a 2D or 3D FOV). In one form, the radiation parameters of the beams 18, 20, 22 are independently controlled by the beam network 50 and/or the controller 90. It should be understood that the antenna 10-6 may be a single port antenna that always generates a single beam having specific radiation parameters in other forms.

Figure 7:
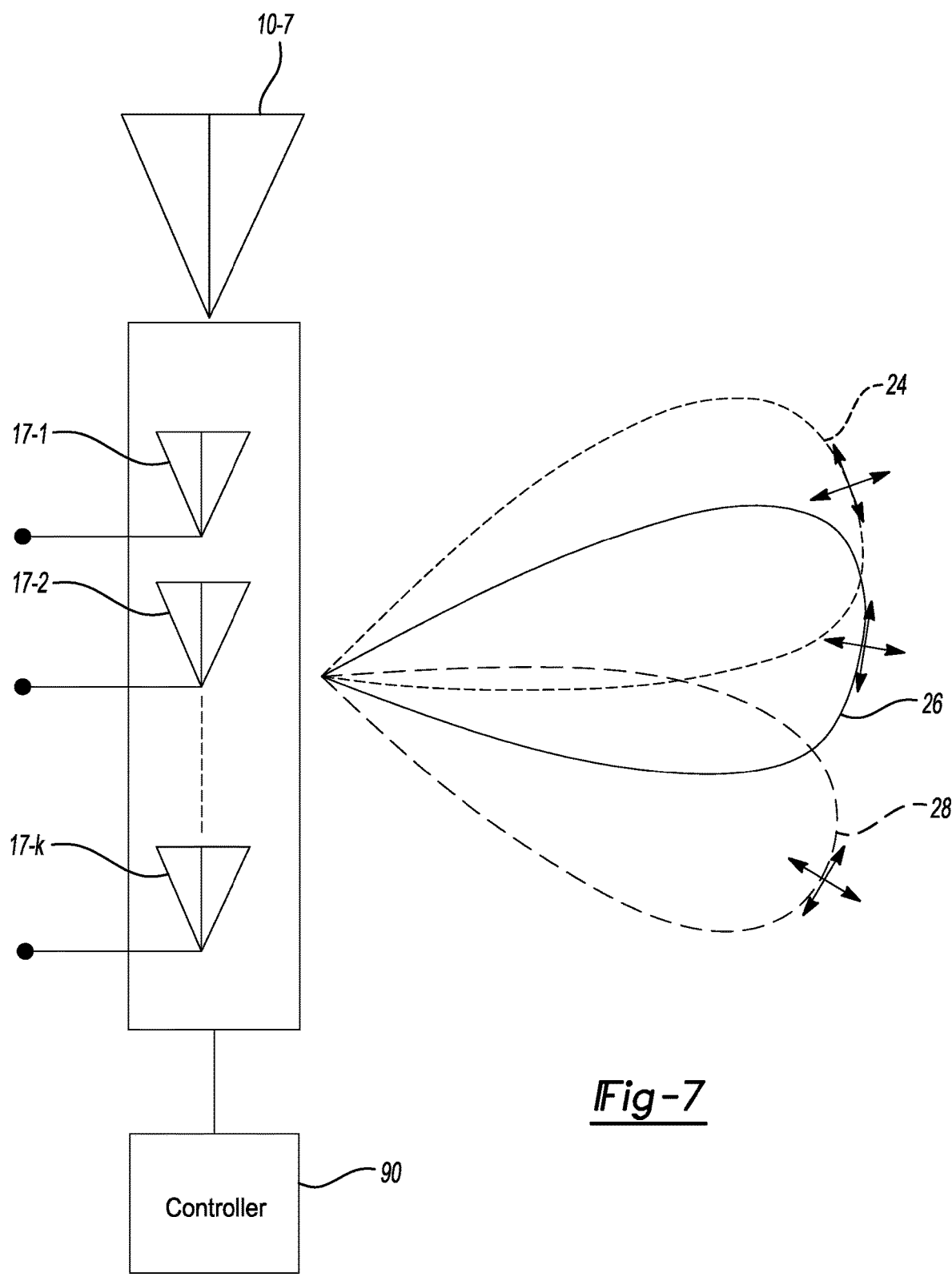
FIG. 7 is a schematic illustration of an example active antenna according to the teachings of the present disclosure.

Referring to FIG. 7, a schematic of beams 24, 26, 28 output by antenna 10-7, which may be an active multiport antenna having ports 17-1, 17-2, . . . 17-k (collectively referred to as "ports 17"), is shown. In one form, the antenna 10-7 includes electrically controlled tunable mechanisms, and the controller 90 is configured to modify the radiation parameters of the beams 24, 26, 28 by tuning the tunable mechanisms of the antenna 10-7. As such, the controller 90 may include external and/or digital control circuits for performing the functionality described herein. In one form, the antenna 10-7 includes active elements integrated therein, thereby enabling the controller 90 to perform beam modification and control routines. While one controller 90 is shown, it should be understood that the front-end antenna system 1 may include multiple controllers 90 (e.g., one controller 90 for each of the antennas 10) in other forms.

Figure 8A:
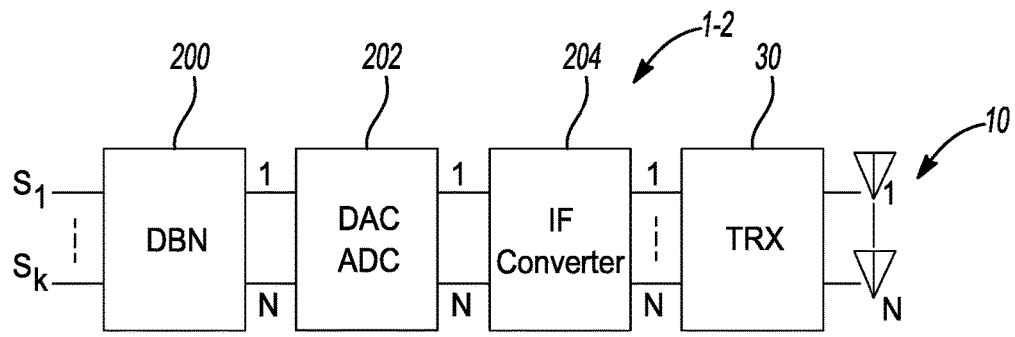
FIG. 8A is a schematic illustration of a front-end antenna system according to the teachings of the present disclosure.
Figure 8B:
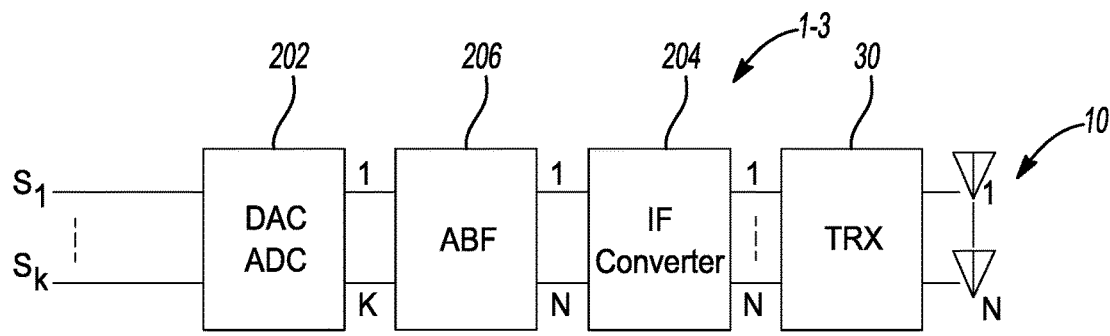
FIG. 8B is another schematic illustration of a front-end antenna system according to the teachings of the present disclosure.
Figure 8C:
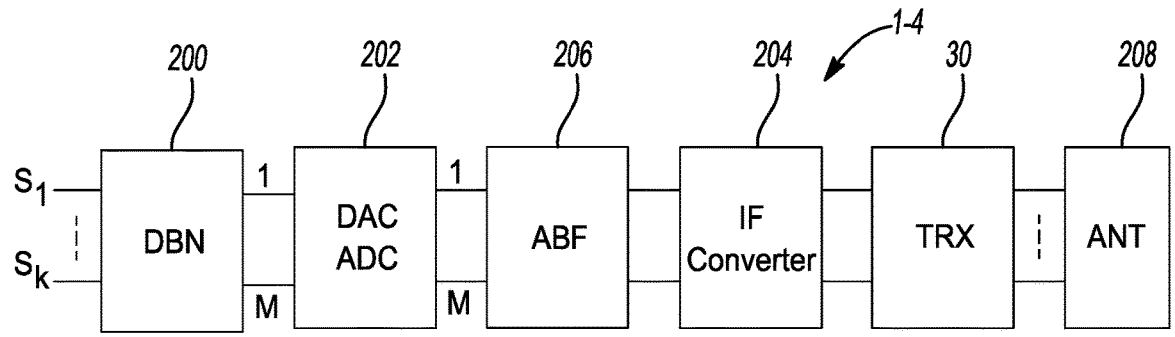
FIG. 8C is another schematic illustration of a front-end antenna system according to the teachings of the present disclosure.

Referring to FIGS. 8A-8C, various example beam networks 50 of the front-end antenna systems are shown. Specifically, FIG. 8A illustrates a digital beam network, as the beam network 50, of front-end antenna system 1-2; FIG. 8B illustrates a hybrid beam network (e.g., analog beam network and digital beam network), as the beam network 50, of front-end antenna system 1-3; and FIG. 8C illustrates a hybrid beam network (e.g., analog beam network and digital beam network), as the beam network 50, of front-end antenna system 1-4.

Referring to FIG. 8A, the front-end antenna system 1-2 includes a set of digital beam networks 200 (as the beam network 50), a converter network 202 (e.g., the DAC 68 and/or ADC 69), an intermediate frequency (IF) converter network 204, the set of transceivers 30, and an array of antennas 10. In one form, the front-end antenna system 1-2 include k beams (where each beam contains one or more signal streams), k digital beam networks 200, and an array of N antennas 10. The digital beam networks 200 are coupled to the converter network 202, which is coupled to the IF converter network 204 (e.g., a set of up/down frequency converters) to convert the beam to a desired frequency of the IF band. The IF stage described herein may correspond to the IF converter network 204; the digital beam network 200 described herein may correspond to the digital stage; and the RF stage may correspond to the converter network 202.

Referring to FIG. 8B, the front-end antenna system 1-3 includes a set of analog beam networks 206 (as the beam network 50). The front-end antenna system 1-3 further includes the converter network 202, the IF converter network 204, the set of transceivers 30, and the array of antennas 10. In one form, the front-end antenna system 1-3 include k beams (where each beam contains one or more signal streams), k analog beam networks 206, and an array of N antennas 10. The converter network 202 is coupled to the analog beam networks 206 to generate the analog signal. The analog beam networks 206 are coupled to the IF converter network 204 (e.g., a set of up/down frequency converters) to convert the beam to a desired frequency of the IF band. It should be understood that components of the front-end antenna system 1-3 may have different arrangements in other forms. As an example, the converter network 202 may be coupled to the IF converter network 204 to convert the beam to a desired frequency of the RF band, and the IF converter network 204 may be coupled to the set of analog beam networks 206 to generate the RF signal.

Referring to FIG. 8C, the front-end antenna system 1-4 includes the set of digital beam networks 200 and the set of analog beam networks 206 (as the beamformer network 50). The front-end antenna system 1-4 further includes the converter network 202, the IF converter network 204, the set of transceivers 30, the array of antennas 10, and an array of antennas 208 (e.g., an array of active antennas). In one form, the front-end antenna system 1-4 include k beams (where each beam contains one or more signal streams), k digital beam networks 200, M analog beam networks 206, an array of N antennas 208, and N' coupling the ports of the antennas 208. In one form, the N' connections may include connections to ports of sets of multiport antennas or sets of single-port antennas, as described below in further detail with reference to FIGS. 9A-9C. In one form, the number of connections (N') is less than or equal to the number of antennas 208 of the array (N). In one form, the number of beams (k) is less than or equal to the number analog beam networks 206 (M).

In one form, the digital beam networks 200 are coupled to the converter network 202, which is coupled to the analog beam networks 206 to generate the analog signal. The analog beam networks 206 are coupled to the IF converter network 204 (e.g., a set of up/down frequency converters) to convert the beam to a desired frequency of the IF band. It should be understood that components of the front-end antenna system 1-4 may have different arrangements in other forms. As an example, the converter network 202 may be coupled to the IF converter network 204 to convert the beam to a desired frequency of the RF band, and the IF converter network 204 may be coupled to the set of analog beam networks 206 to generate the RF signal.

In one form, the front-end antenna system 1-4 is operable in a transmit mode, a receive mode, or simultaneously operates in the transmit and receive modes. As an example, in a transmit mode, the digital beam network 200 is configured to split and/or select the one or more signal streams, the DAC 68 is configured to convert the one or more signal streams to one or more analog signal streams, the analog beam network 206 is configured to split and/or select the one or more signal streams, or a combination thereof. As another example, in a receive mode, the analog beam network 206 is configured to combine and/or select the one or more signal streams, the ADC 69 is configured to convert the one or more signal streams to one or more digital signal streams, the digital beam network 200 is configured to combine and/or select the one or more signal streams, or a combination thereof.

Figure 9A:
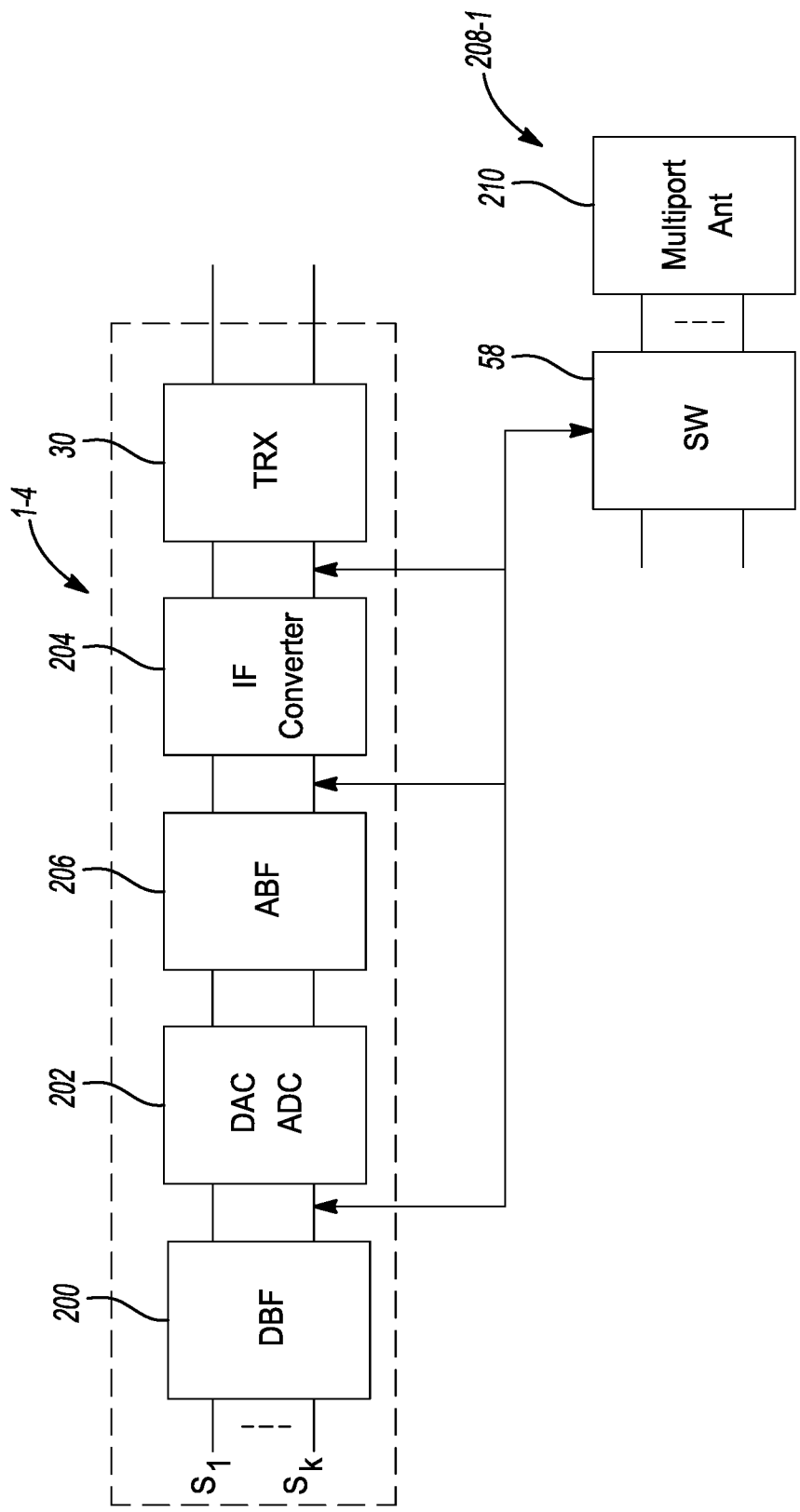
FIG. 9A is a schematic illustration of an example set of antennas according to the teachings of the present disclosure.

Referring to FIG. 9A, an example set of antennas 208-1 (as the antennas 208) of the front-end antenna system 1-4 is shown. In one form, the set of antennas 208-1 includes a multiport antenna 210 having x' ports and may couple to the switching network 58. In one form, the switching network 58 is configured to independently control the x' ports of the multiport antenna 210 and therefore control various radiation parameters of the multiport antenna 210, such as the beam direction, polarization, power, etc. The switching networks 58 may be implemented at one or more stages of the front-end antenna system 1-4, such as the digital stage, the IF stage, the RF stage, or a combination thereof. In one form, the set of beamformer networks 51 may be implemented at one or more stages of the front-end antenna system 1-4, such as the digital stage (DBF), the analog stage (ABF), or a combination thereof.

Figure 9B:
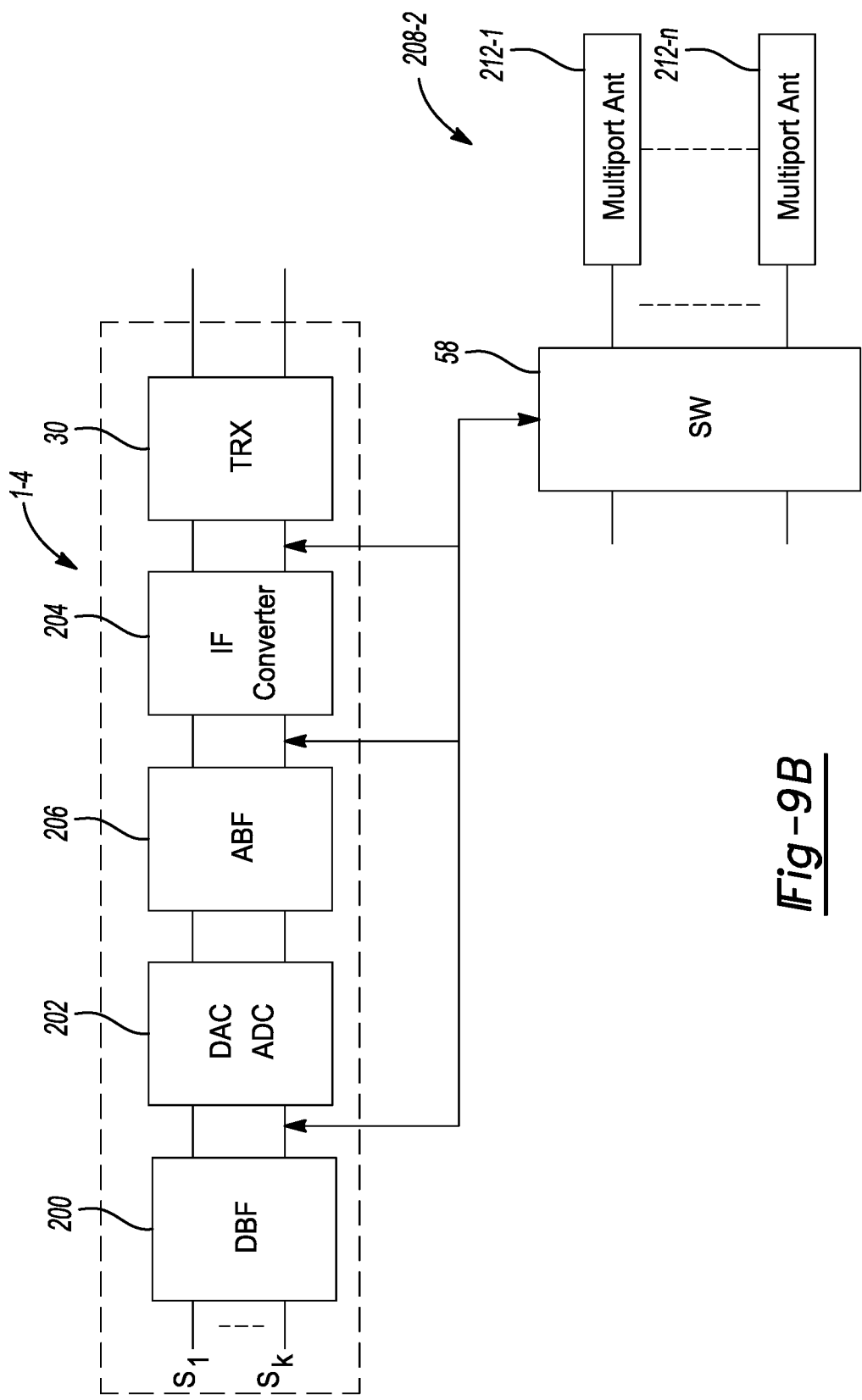
FIG. 9B is a schematic illustration of another example set of antennas according to the teachings of the present disclosure.

Referring to FIG. 9B, an example set of antennas 208-2 (as the antennas 208) of the front-end antenna system 1-4 is shown. In one form, the set of antennas 208-2 includes a plurality of multiport antennas 212-1, . . . 212-n (collectively referred to as multiport antennas 212) that collectively form y' ports. It should be understood that each of the multiport antennas 212 may have the same or a different number of ports. In one form, the number of ports (y') is equal to a number of connections to the antennas 208-2 (J). It should be understood that the set of antennas 208-2 may couple to the switching network 58 to independently control the y' ports of the multiport antennas 212 and therefore control various radiation parameters of the multiport antennas 212, such as the beam direction, polarization, power, etc. In one form, the set of switching networks 58 may be implemented at one or more stages of the front-end antenna system 1-4, such as the digital stage, the IF stage, RF stage, or a combination thereof. Similarly, the set of beamformer networks 51 may be implemented at one or more stages of the front-end antenna system 1-4, such as the DBF, ABF, or a combination thereof.

Figure 9C:
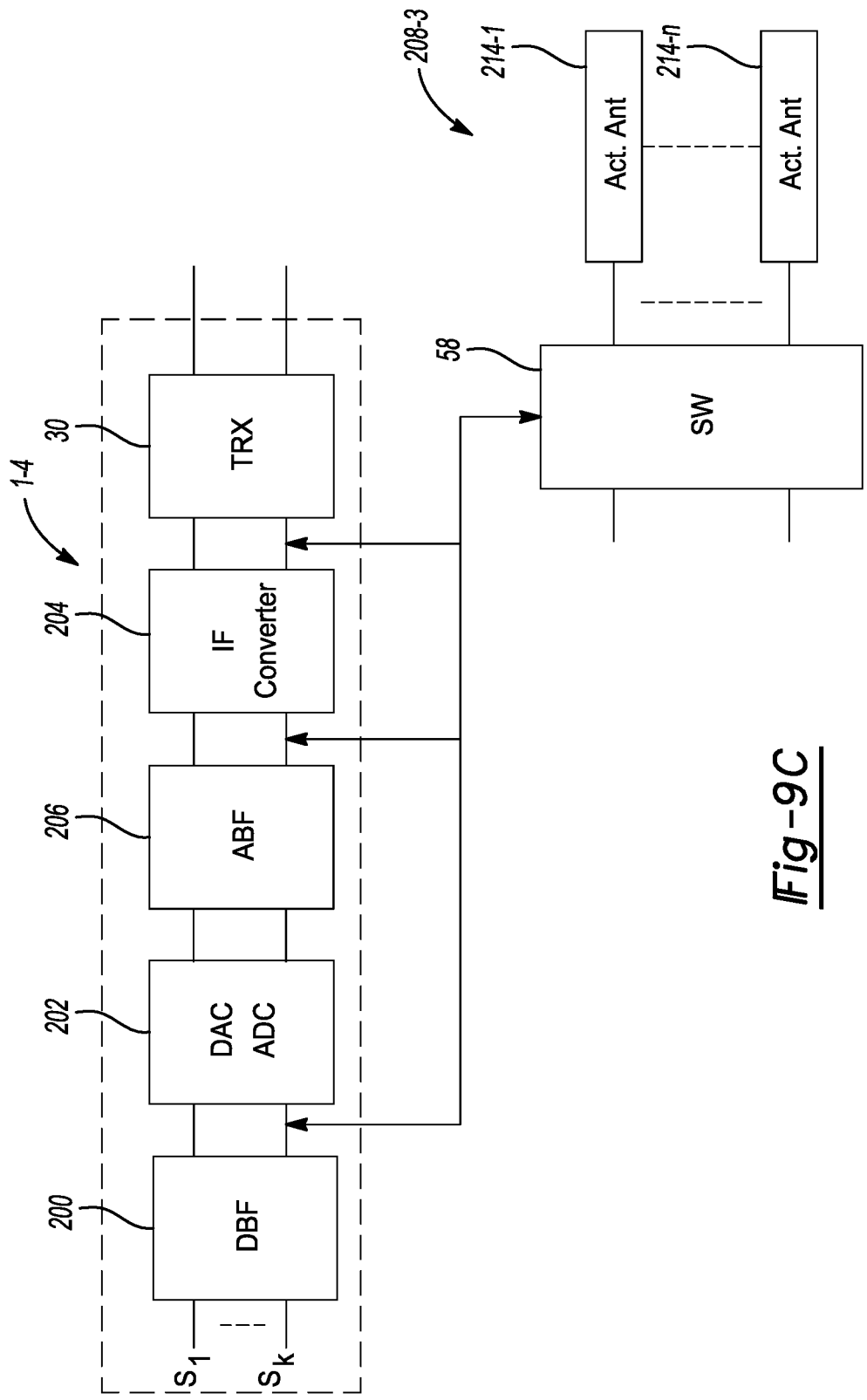
FIG. 9C is a schematic illustration of yet another example set of antennas according to the teachings of the present disclosure.

Referring to FIG. 9C, an example set of antennas 208-3 (as the antennas 208) of the front-end antenna system 1-4 is shown. In one form, the set of antennas 208-3 includes a plurality of active antennas 214-1, . . . 214-n (collectively referred to as active antennas 214) collectively forming z' ports that may couple to a switching network 58, where the switching network 58 has a number of switches 60. The switching network 58 is configured to independently control the z' ports of the active antennas 214 and therefore control various radiation parameters, such as the beam direction, power, polarization, the beam form, etc. In one form, the set of switching networks 58 may be implemented at one or more stages of the front-end antenna system 1-4, such as the digital stage, the IF stage, RF stage, or a combination thereof. Similarly, the set of beamformer networks 51 may be implemented at one or more stages of the front-end antenna system 1-4, such as the DBF, ABF, or a combination thereof.

Figure 10:
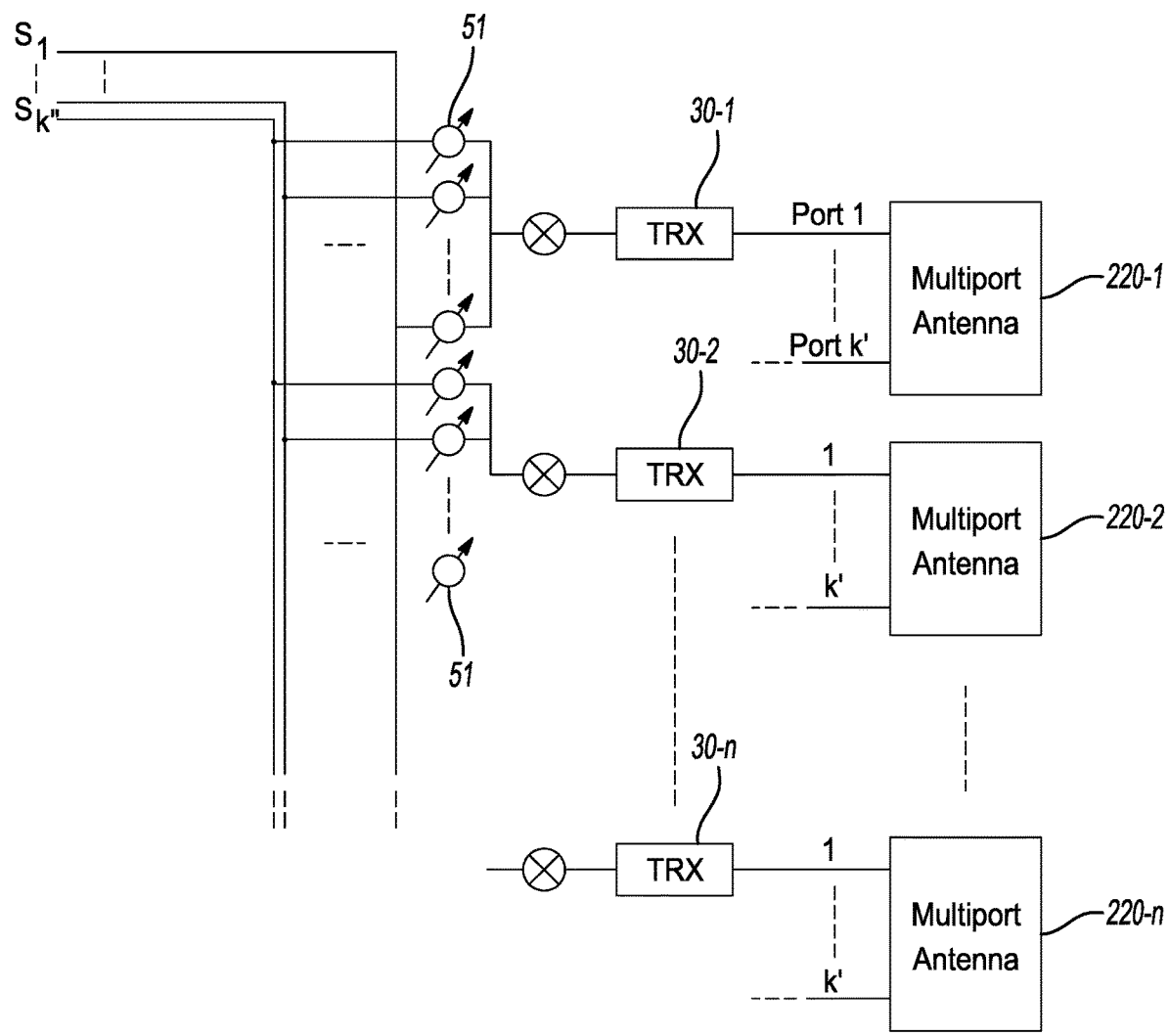
FIG. 10 is a schematic illustration of a front-end antenna system that includes a set of multiport antennas according to the teachings of the present disclosure.

Referring to FIG. 10, example multiport antennas 220-1, 220-2, . . . 220-n (as one of the multiport antennas 210, 212 shown in FIGS. 9A-9B; collectively referred to as "multiport antennas 220") are shown. In one form, each multiport antenna 220 includes k' ports and is connected to a set of k" beamformer networks 51. In one form, each multiport antenna 220 is connected to a given transceiver 30, but it should be understood that each multiport antenna 220 may be connected to more than one transceiver 30 from among the set of transceivers 30. In one form, the set of transceivers 30 is connected to the set of k" beamformer networks 51. As such, the k" beamformer networks 51 may form k beams, where k=k'*k". In one form, each antenna port of the multiport antennas 220 is coupled to at least two delay elements (i.e., the phase shifter 52 and/or the time delay 54) of a given beamformer network 51.

Referring to FIG. 11, an illustration of N' active antennas 214 (as the antennas 208) are shown. In one form, the active antennas 214 include a single port antenna, a multiport antenna, or a combination thereof, and the active antennas 214 collectively form k' ports. In one form, each active antenna 214 and is connected to a set of k" beamformer networks 51 and to a given transceiver 30, but it should be understood that each active antenna 214 may be connected to more than one transceiver 30 from among the set of transceivers 30. In one form, the set of transceivers 30 is connected to the set of k" beamformer networks 51. As such, the k" beamformer networks 51 may form k beams, where k=k", k=k"*k", or k"≤k≤k'*k". In one form, each antenna port of the active antennas 214 is coupled to at least two delay elements (i.e., the phase shifter 52 and/or the time delay 54) of a given beamformer network 51.

Referring to FIG. 12A, an example functional block diagram of the front-end antenna systems configured to perform hybrid beam network processing (e.g., the front-end antenna system 1-4) is shown. In one form, the layers of the functional block diagram correspond to various stages/functionality of the front-end antenna systems 1-4. While the layers are shown individually, it should be understood that any one of the layers may be combined with each other in other forms and is not limited to the arrangement described herein.

In one form, the front-end antenna system 1-4 includes an antenna layer 300, an analog layer 310 (interchangeably referred to herein as the RF layer 310), and a digital layer 320. In one form, the antenna layer 300 includes a distribution network layer 302 that includes antenna interfaces/ports, a feed layer 304 that includes the antenna structure, and a radiation layer 306 that includes the tunable components of the antennas 10. In one form, the analog layer 310 includes an IF beam network layer 312, an RF beam network layer 314, and a TRX layer 316 for performing the functionality described herein. In one form, the digital layer 320 includes a baseband layer 322 for performing baseband processing, a digital beam network layer 324, and a DAC/ADC layer 326 for performing the analog-digital/digital-analog conversions. It should be understood that the digital layer 320 may include modems and other digital system components. In one form, the separation of the analog and digital grouping may provide for the integration of the analog circuitry and blocks on a single die, or a set of dies, with the same technology node.

Referring to FIG. 12B, another example functional block diagram of the front-end antenna systems 1-4 is shown. The functional block diagram illustrated in FIG. 12B is similar to the functional block diagram illustrated in FIG. 12A, except that the IF beamforming layer 312 is provided within the digital layer 320.

Referring to FIG. 12C, an additional example functional block diagram of the front-end antenna systems 1-4 is shown. The functional block diagram illustrated in FIG. 12C is similar to the functional block diagram illustrated in FIG. 12C, except that the RF layer 310 and the digital layer 320 are provided within an integrated circuit layer 330.

In one form, the antenna layer 300, the analog layer 310, the digital layer 320, and/or the integrated circuit layer 330 may be provided on and/or include a printed circuit board (PCB); 3D or 2.5D molded and/or machined structures; dielectric, metal, and/or air-filled structures and materials; passive and or active electronic devices (e.g. varactors, diodes, transistors, thin-film transistors (TFT), etc.), tunable materials (e.g. barium strontium titanate (BST)-based materials, liquid crystal, etc.), and or structures; among others. In one form, the antenna layer 300, the analog layer 310, the digital layer 320, and/or the integrated circuit layer 330 may be provided on and/or include of RFICs, Application-Specific Integrated Circuit (ASICs), SoCs, and/or a set of such blocks (among other blocks, components, connecting lines, etc.) integrated on the PCB.

Referring to FIG. 13, an example computer architecture diagram of one implementation of a computing system 1000 and the front-end antenna system 1 is shown. In some implementations, the computing system 1000 is implemented in a plurality of devices communicably coupled via a communication channel and/or network. In some forms, the components of the computing system 1000 are implemented in separate computing and or sensor devices. In some forms, two or more components of the computing system 1000 are implemented in the same devices. The computing system 1000 and portions thereof may be integrated into a computing and/or wireless device.

In one form, a communication channel 1001 interfaces with processors 1002A-1002N, a memory component (e.g., a random-access memory (RAM)) 1003, a read-only memory (ROM) 1004, and/or a processor-readable storage medium 1005), a display device 1006, a user input device 1007, a network device 1008, the front-end antenna systems 1 described herein, and/or other suitable computing devices.

In one form, the processors 1002A-1002N may include central processing units (CPUs), graphical processing units (GPUs), microprocessors, machine learning/deep learning (ML/DL) processing units (e.g., a tensor processing unit), FPGA (Field Programmable Gate Arrays, custom processors, and/or any suitable type of processor.

In one form, the processors 1002A-1002N and the memory components 1003 collectively form a processing unit 1010. In some embodiments, the processing unit 1010 includes one or more processors communicably coupled to one or more of the memory components 1003, the ROM 1004, and the processor-readable storage medium 1005 via a bus to execute instructions stored therein. In one form, the processing unit 1010 is an ASIC, SoC, or combination thereof.

In one form, the network device 1008 provides one or more wired or wireless interfaces for exchanging information between the computing system 1000 and/or other devices, such as external devices. Example network devices 1008 include, but are not limited to: a universal serial bus (USB) interface, a BLUETOOTH interface, wireless fidelity (Wi-Fi) interface, an Ethernet interface, a near field communication (NFC) interface, a cellular interface, among others.

In one form, the processor-readable storage medium 1005 is a hard drive, a flash drive, a DVD, a CD, an optical disk, a floppy disk, a flash storage, a solid-state drive, a ROM, an EEPROM, an electronic circuit, a semiconductor memory device, or a combination thereof. The processor-readable storage medium 1005 may include an operating system, software programs, device drivers, and/or other suitable sub-systems or software.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase "at least one of A, B, and C" and "a combination thereof" should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A front-end antenna system for transmitting and receiving one or more beams and including at least one of a radio frequency (RF) stage, an intermediate frequency (IF) stage, and a digital stage, the front-end antenna system comprising:
   one or more beam networks configured to form one or more signal streams over the one or more beams, wherein each beam network from among the one or more beam networks comprises a beamformer network and a switching network;
   an array of multiport antennas configured to output or receive each of the beams in a selected beam direction from among a plurality of beam directions and a selected polarization from among one or more polarizations, wherein:
      each multiport antenna among the array of multiport antennas includes a plurality of ports,
      at least two ports among the plurality of ports is provided for at least one polarization among the one or more polarizations,
      each port of the multiport antenna is operable to output or receive a beam from the one or more beams in a designated beam direction from among the plurality of beam directions,
      the designated beam direction of a port from among the plurality of ports is based at least on the polarization of the beam,
   a plurality of transceivers that electrically couple the array of multiport antennas and the one or more beam networks; wherein:
      the switching network selectively couples the beamformer network to selected ports from among the plurality of ports of at least two multiport antennas from among the array of multiport antennas.

2. The front-end antenna system of claim 1 further comprising a controller configured to independently control radiation parameters and a beam type of the one or more beams, wherein:
   the radiation parameters comprise a beam direction from among the plurality of beam directions, a pattern, a power, a polarization from among the one or more polarization, a phase angle, frequency band, or a combination thereof; and
   the beam type includes one of a transmit type beam, a receive type beam, and a simultaneous receive and transmit type beam.

3. The front-end antenna system of claim 1, wherein:
   the one or more beams include at least two beams having same polarization; and
   a multiport antenna from among the array of multiport antennas is operable to transmit, receive, or a combination thereof the at least two beams having same polarization from at least two ports from among the plurality of ports, wherein the at least two ports are associated with different beam directions from among the plurality of beam directions.

4. The front-end antenna system of claim 1, wherein the beamformer network includes one or more phase shifters, one or more time delay circuits, one or more combiners, one or more variable gain amplifiers, one or more splitters, or a combination thereof.

5. The front-end antenna system of claim 1, wherein the one or more beam networks are configured to form the one or more beams at the RF stage, the IF stage, the digital stage, a local oscillator stage, or a combination thereof.

6. The front-end antenna system of claim 1, wherein a number of the plurality of transceivers is less than a number of ports of the multiport antenna from among the array of multiport antennas.

7. The front-end antenna system of claim 1, wherein:
   the switching network includes one or more switches, one or more combiners, one or more splitters, one or more coupling lines, one or more filters, or a combination thereof.

8. The front-end antenna system of claim 1, wherein:
   the one or more beams include at least two beams;
   the one or more beam networks include a plurality of the beamformer networks to output a plurality of signal streams; and
   at least two signal streams from among the plurality of signal streams outputted by at least two beamformer networks from among the plurality of beamformer networks are combined and transmitted or are received and split via a transceiver from among the plurality of transceivers and a multiport antenna from among the array of multiport antennas.

9. The front-end antenna system of claim 1, wherein:
   the beam network is a hybrid beam network having an analog beam network portion and a digital beam network portion;
   the plurality of transceivers include an analog to digital converter and a digital to analog converter;
   in a transmit mode, (i) the digital beam network portion is configured to split the one or more signal streams, (ii)

the digital beam network portion is configured to select the one or more signal streams, (iii) the digital to analog converter is configured to convert the one or more signal streams to one or more analog signal streams, and the analog beam network portion is configured to split the one or more signal streams, select the one or more signal streams, or a combination thereof, (iv) or a combination of (i), (ii), (iii); and in a receive mode, (v) the analog beam network portion is configured to combine the one or more signal streams, (vi) the analog beam network portion is configured to select the one or more signal streams, (vii) the analog to digital converter is configured to convert the one or more signal streams to one or more digital signal streams, and the digital beam network portion is configured to combine the one or more signal streams, select the one or more signal streams, or a combination thereof, (viii) or a combination of (v), (vi), (vii).

10. The front-end antenna system of claim 1 further comprising a plurality of sub-arrays, wherein:
   each sub-array from among the plurality of sub-arrays includes:
      one or more substrate layers, one or more electronic chips, or a combination thereof;
      one or more multiport antennas from among the array of multiport antennas; and
      a set of transceivers from among the plurality of transceivers; and
   the plurality of sub-arrays are coupled to each other via signal distribution networks, the one or more beam networks, the plurality of transceivers, or a combination of thereof.

11. The front-end antenna system of claim 10, wherein:
   the plurality of sub-arrays have one of a planar arrangement and a non-planar arrangement;
   a first sub-array from among the plurality of sub-arrays has a first set of geometric parameters;
   a second sub-array from among the plurality of sub-arrays has a second set of geometric parameters; and
   at least one geometric parameter from among the first set of geometric parameters is different than at least one geometric parameter from among the second set of geometric parameters.

12. The front-end antenna system of claim 1, wherein at least one multiport antenna from the array of multiport antennas is an active antenna comprising one or more tunable components.

13. The front-end antenna system of claim 1, wherein the switching network selectively couples the beamformer network to two or more selected ports from among the plurality of ports of at least one multiport antenna from among the array of multiport antennas.

14. A front-end antenna system for transmitting and receiving two or more beams and including at least one of a radio frequency (RF) stage, an intermediate frequency (IF) stage, and a digital stage, the front-end antenna system comprising:
   one or more beam networks configured to form two or more signal streams over the two or more beams, wherein each beam network from among the one or more beam networks comprises a plurality of beamformer networks, wherein each beamformer network outputs a signal stream from among the two or more signal streams that is indicative of data that is different from other signal streams from among the two or more signal streams, wherein the plurality of beamformer networks are analog beamformers;
   an array of antennas configured to output each of the beams in a selected spatial region from among a plurality of spatial regions, wherein each antenna from among the array of antennas includes one or more ports; and
   a plurality of transceivers that electrically couples the array of antennas and the plurality of beamformer networks of the one or more beam networks, wherein:
   at least two signal streams from among the plurality of signal streams outputted by at least two beamformer networks from among the plurality of beamformer networks are combined and transmitted or are received and split via a transceiver from among the plurality of transceivers and an antenna from among the array of antennas.

15. The front-end antenna system of claim 14, wherein:
   each beamformer network from among the plurality of the beamformer networks includes a phase shifter, a time delay circuit, a combiner, a variable gain amplifier, a splitter, or a combination thereof.

16. The front-end antenna system of claim 14, wherein the antennas are active antennas comprising one or more tunable components.

17. The front-end antenna system of claim 14 further comprising a controller configured to independently control radiation parameters and a beam type of the plurality of beams, wherein:
   the radiation parameters comprise a beam direction, a pattern, a power, a polarization, a phase angle, frequency band, or a combination thereof; and
   the beam type includes one of a transmit type beam, a receive type beam, and a simultaneous receive and transmit type beam.

18. The front-end antenna system of claim 14, wherein:
   the one or more beam networks include a switching network; and
   the switching network includes one or more switches, one or more combiners, one or more splitters, one or more coupling lines, one or more filters, or a combination thereof.

19. The front-end antenna system of claim 14, wherein the one or more beam networks are configured to form the one or more beams at the RF stage, the IF stage, the digital stage, a local oscillator stage, or a combination thereof.

20. The front-end antenna system of claim 14, wherein the one or more beam networks further includes at least one digital beamformer that is coupled to at least one analog beamformer of at least one beamformer network from among the plurality of beamformer networks.

* * * * *